US012765968B2

(12) United States Patent
Velamakanni et al.

(10) Patent No.: US 12,765,968 B2
(45) Date of Patent: Oct. 20, 2026

(54) MANUFACTURING A DENTAL APPLIANCE WITH A SURFACE HAVING DISCRETE STRUCTURES

(71) Applicant: Solventum Intellectual Properties Company, Eagan, MN (US)

(72) Inventors: Bhaskar V. Velamakanni, Woodbury, MN (US); Kevin T. Reddy, Minneapolis, MN (US); Matthew S. Stay, Bloomington, MN (US); Matthew R.D. Smith, Woodbury, MN (US); Kevin W. Gotrik, Hudson, WI (US); Mikhail L. Pekurovsky, Bloomington, MN (US); Scott J. Jones, Woodbury, MN (US); Ta-Hua Yu, Woodbury, MN (US); Thomas J. Metzler, Saint Paul, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 809 days.

(21) Appl. No.: 17/785,078

(22) PCT Filed: Dec. 29, 2020

(86) PCT No.: PCT/IB2020/062522
§ 371 (c)(1),
(2) Date: Jun. 14, 2022

(87) PCT Pub. No.: WO2021/137159
PCT Pub. Date: Jul. 8, 2021

(65) Prior Publication Data

US 2023/0013219 A1 Jan. 19, 2023

Related U.S. Application Data

(60) Provisional application No. 62/955,049, filed on Dec. 30, 2019.

(51) Int. Cl.
*A61C 7/08* (2006.01)
*A01N 37/12* (2006.01)
*A61C 19/06* (2006.01)

(52) U.S. Cl.
CPC ................ *A61C 7/08* (2013.01); *A01N 37/12* (2013.01); *A61C 19/063* (2013.01); *A61C 2201/00* (2013.01)

(58) Field of Classification Search
CPC ................................ A61C 19/063; A61C 7/08
See application file for complete search history.

(56) References Cited

U.S. PATENT DOCUMENTS 4,298,738 A 11/1981 Lechtken et al.
4,324,744 A 4/1982 Lechtken et al.
(Continued)

FOREIGN PATENT DOCUMENTS

CN 103200898 A 7/2013
CN 103281986 A 9/2013
(Continued)

OTHER PUBLICATIONS

Buschang, "Incidence of white spot lesions among patients treated with clear aligners and traditional braces", Angle Orthodontist, May 1, 2019, vol. 89, No. 3, pp. 359-364.
(Continued)

*Primary Examiner* — Xiao S Zhao
*Assistant Examiner* — Nicholas J Chidiac

(57) ABSTRACT

A method for making a dental appliance configured to position at least one tooth of a patient includes printing a hardenable liquid resin composition on a major surface of a polymeric material to form a pattern of discrete unhardened liquid regions thereon; at least partially hardening the unhardened liquid regions to form a corresponding array of structures on the major surface of the polymeric material,
(Continued)

wherein the structures have a characteristic cross-sectional dimension of about 25 microns to about 1 mm, and a feature spacing of about 100 microns to about 2000 microns; and forming a plurality of cavities in the polymeric material to form the dental appliance including an arrangement of cavities configured to receive one or more teeth.

11 Claims, 11 Drawing Sheets

(56) References Cited

U.S. PATENT DOCUMENTS

| | | | | |
|---|---|---|---|---|
| 4,356,296 | A | 10/1982 | Griffith et al. | |
| 4,385,109 | A | 5/1983 | Lechtken et al. | |
| 4,503,169 | A | 3/1985 | Randklev | |
| 4,642,126 | A | 2/1987 | Zador et al. | |
| 4,648,843 | A | 3/1987 | Mitra | |
| 4,652,274 | A | 3/1987 | Boettcher et al. | |
| 4,665,217 | A | 5/1987 | Reiners et al. | |
| 4,695,251 | A | 9/1987 | Randklev | |
| 4,710,523 | A | 12/1987 | Lechtken et al. | |
| 4,737,593 | A | 4/1988 | Ellrich et al. | |
| 4,752,338 | A | 6/1988 | Reiners et al. | |
| 5,026,902 | A | 6/1991 | Fock et al. | |
| 5,076,844 | A | 12/1991 | Fock et al. | |
| 5,183,597 | A | 2/1993 | Lu | |
| 5,510,066 | A * | 4/1996 | Fink | G05B 19/4099 427/427 |
| 5,545,676 | A | 8/1996 | Palazzotto et al. | |
| 6,030,606 | A | 2/2000 | Holmes | |
| 6,244,864 | B1 * | 6/2001 | Fujiwara | A61C 19/05 433/48 |
| 6,251,963 | B1 | 6/2001 | Kohler et al. | |
| 6,267,782 | B1 | 7/2001 | Ogle et al. | |
| 6,390,812 | B1 * | 5/2002 | Chishti | A61C 7/08 433/24 |
| 6,607,382 | B1 | 8/2003 | Kuo et al. | |
| 6,765,036 | B2 | 7/2004 | Dede et al. | |
| 7,018,713 | B2 | 3/2006 | Padiyath et al. | |
| 7,905,724 | B2 | 3/2011 | Kuo et al. | |
| 8,569,396 | B1 | 10/2013 | Sloan | |
| 8,658,248 | B2 | 2/2014 | Anderson et al. | |
| 8,978,659 | B2 | 3/2015 | Bardach et al. | |
| 8,986,005 | B2 | 3/2015 | Montgomery | |
| 9,452,242 | B2 | 9/2016 | Dehnad et al. | |
| 9,480,540 | B2 | 11/2016 | Cinader, Jr. et al. | |
| 9,688,063 | B2 | 6/2017 | Muller | |
| 9,827,790 | B1 | 11/2017 | Moore et al. | |
| 11,278,381 | B2 * | 3/2022 | Hagenbuch | A61C 13/087 |
| 11,344,384 | B2 * | 5/2022 | Stemmer | A61C 13/0004 |
| 11,419,710 | B2 * | 8/2022 | Mason | B23K 26/362 |
| 11,857,651 | B2 * | 1/2024 | Florez | C08F 2/50 |
| 2002/0051951 | A1 * | 5/2002 | Chishti | A61C 7/00 433/6 |
| 2005/0101213 | A1 | 5/2005 | Foss | |
| 2008/0182218 | A1 | 7/2008 | Chen et al. | |
| 2017/0007386 | A1 * | 1/2017 | Mason | G06Q 30/0643 |
| 2017/0008333 | A1 * | 1/2017 | Mason | B44C 1/228 |
| 2017/0100210 | A1 | 4/2017 | Wen | |
| 2018/0243051 | A1 * | 8/2018 | Stemmer | A61C 5/20 |
| 2018/0279606 | A1 | 10/2018 | Yamashita et al. | |
| 2020/0054423 | A1 * | 2/2020 | Hagenbuch | A61K 6/78 |
| 2020/0085698 | A1 * | 3/2020 | Florez | A61K 6/844 |
| 2021/0000579 | A1 * | 1/2021 | Higdon | A61M 5/3007 |
| 2023/0000596 | A1 * | 1/2023 | Velamakanni | B33Y 10/00 |
| 2024/0041565 | A1 * | 2/2024 | Wang | A61C 19/063 |

FOREIGN PATENT DOCUMENTS

| | | | |
|---|---|---|---|
| EP | 0173567 | A2 | 3/1986 |
| EP | 0201778 | B1 | 12/1988 |
| EP | 0201031 | B1 | 8/1989 |
| EP | 0373384 | B1 | 10/1992 |
| GB | 2529517 | A | 2/2016 |
| WO | 2000038619 | A2 | 7/2000 |
| WO | 2000042092 | A1 | 7/2000 |
| WO | 2000048037 | A2 | 8/2000 |
| WO | 2000069362 | A1 | 11/2000 |
| WO | 2001007444 | A1 | 2/2001 |
| WO | 2001092271 | A1 | 12/2001 |
| WO | 2012091902 | A1 | 7/2012 |
| WO | 2016182444 | A1 | 11/2016 |
| WO | 2017006178 | A1 | 1/2017 |
| WO | 2018178802 | A1 | 10/2018 |
| WO | 2018178803 | A1 | 10/2018 |
| WO | 2020079555 | A1 | 4/2020 |

OTHER PUBLICATIONS

International Search Report for PCT Application No. PCT/IB2020/062522 mailed on Feb. 25, 2021, 9 pages.
Sundararaj, “Critical evaluation of incidence and prevalence of white spot lesions during fixed orthodontic appliance treatment: A meta-analysis”, Nov.-Dec. 2015, vol. 5, No. 6, pp. 433-439.
Extended European Search Report for European Application No. EP209099456 dated Jan. 5, 2024, 8 pages.

* cited by examiner

MANUFACTURING A DENTAL APPLIANCE WITH A SURFACE HAVING DISCRETE STRUCTURES

CROSS REFERENCE TO RELATED APPLICATIONS

This application is a national stage filing under 35 U.S.C. 371 of PCT/IB2020/062522, filed 29 Dec. 2020, which claims the benefit of U.S. Provisional Application No. 62/955,049, filed 30 Dec. 2019, the disclosures of which are incorporated by reference in their entireties herein.

BACKGROUND

Orthodontic treatments reposition misaligned teeth and improve bite configurations for improved cosmetic appearance and dental function. Teeth are repositioned by applying controlled forces to the teeth over an extended time period. In one example, teeth may be repositioned by placing a dental appliance, generally referred to as an orthodontic aligner or an orthodontic aligner tray, over the teeth of the patient for each treatment stage of an orthodontic treatment. The orthodontic alignment tray includes a polymeric shell defining a plurality of cavities for receiving one or more teeth. The individual cavities in the polymeric shell are shaped to exert force on one or more teeth to resiliently and incrementally reposition selected teeth or groups of teeth in the upper or lower jaw.

A series of orthodontic aligner trays are provided to a patient to be worn sequentially and alternatingly during each stage of the orthodontic treatment to gradually reposition teeth from one tooth arrangement to a successive tooth arrangement to achieve a desired tooth alignment condition. Once the desired alignment condition is achieved, an aligner tray, or a series of aligner trays, may be used periodically or continuously in the mouth of the patient to maintain tooth alignment. In addition, orthodontic retainer trays may be used for an extended time period to maintain tooth alignment following the initial orthodontic treatment.

In some examples, a stage of orthodontic treatment may require that an aligner tray remain in the mouth of the patient for several hours a day, over an extended time period of days, weeks or even months. While the orthodontic aligner tray is in use in the mouth of the patient, foods or other substances can stain or otherwise damage the appliance. In addition, microorganisms can contaminate the surface of the appliance, which in some cases can also cause biofilms to form on the surface. The biofilms can be difficult to remove, even if the appliance is periodically cleaned. Microorganisms or biofilm buildup on the surface of the aligner tray can stain or otherwise discolor the aligner tray, can cause undesirable tastes and odors, and even potentially lead to various periodontal diseases.

Structures can be applied to a selected surface of an aligner tray by traditional printing techniques or by microreplication. Traditional printing is inexpensive, capable of wide formats at high speeds, and can provide fine scale printed patterns of discrete structures that are separate and distinct from each another. However, apart from selection of ink rheology, surface tension, and wettability of the substrate, traditional printing techniques are not intended to control the surface topography of the printed structures. Microreplication provides a pattern of structures that are indistinct and have land areas between them.

Microreplication makes possible more exact control over the topography of patterned features, but microreplication processes provide a continuously structured layer with land areas between individual structures.

SUMMARY

In general, the present disclosure is directed to a dental appliance that includes a polymeric film substrate to which a pattern of discrete structures has been applied using a direct or indirect printing process. In some embodiments, microstructures may be formed on an exposed surface of the discrete structures. The printed substrate with the discrete structures may be formed into a dental appliance including one or more tooth-retaining cavities, and the discrete structures may be present on an interior surface of the dental appliance adjacent to the teeth of a patient, or on an outwardly facing surface of the dental appliance facing away from the teeth, or both.

In various embodiments, the discrete structures may be applied in an aesthetic pattern, and in some cases the discrete structures include an optional therapeutic agent that provides a beneficial effect when the formed dental appliance is ultimately utilized in a mouth of a patient. For example, the therapeutic agents or compounds released therefrom can protect the teeth against decalcification, reduce cavities, prevent biofilm formation on the exposed surfaces of the dental appliance, and the like. In another aspect, the discrete structures on the dental appliance can be used to modify the force applied to the teeth of the patient such as, for example, to counteract viscoelastic creep/stretch, which can enhance the effectiveness of a particular treatment protocol and improve patient comfort.

In one aspect, the present disclosure is directed to a method for making a dental appliance configured to position at least one tooth of a patient. The method includes printing a hardenable liquid resin composition on a major surface of a polymeric material to form a pattern of discrete unhardened liquid regions thereon; at least partially hardening the unhardened liquid regions to form a corresponding array of structures on the major surface of the polymeric material, wherein the structures have a characteristic cross-sectional dimension of about 25 microns to about 1 mm, and a feature spacing of about 100 microns to about 2000 microns; and forming a plurality of cavities in the polymeric material to form the dental appliance including an arrangement of cavities configured to receive one or more teeth.

In another aspect, the present disclosure is directed to a method for making a dental appliance configured to position at least one tooth of a patient. The method includes printing a hardenable liquid composition on a major surface of a release substrate to form a discontinuous pattern of unhardened liquid regions thereon; at least partially hardening the unhardened liquid regions to form a corresponding array of structures, wherein the structures have a characteristic cross-sectional dimension of about 25 microns to about 1 mm, and a feature spacing of about 100 microns to about 2000 microns; contacting the release substrate with a major surface of the polymeric material such that the structures contact the major surface of the polymeric material; separating the release substrate and the polymeric material such that the structures transfer from the release substrate to the major surface of the polymeric material; and forming a plurality of cavities in the polymeric material to form the dental appliance with a polymeric shell having cavities configured to receive one or more teeth.

In another aspect, the present disclosure is directed to a method for making a dental appliance configured to position at least one tooth of a patient, which includes: printing a hardenable liquid resin composition on a major surface of a first polymeric film to form a pattern of discrete unhardened liquid regions thereon; forming a corresponding array of structures on the major surface of the first polymeric film, wherein the structures have a characteristic cross-sectional dimension of about 25 microns to about 1 mm, and a feature spacing of about 100 microns to about 2000 microns; contacting the major surface of the first polymeric film with a major surface of a second polymeric film, wherein the major surface of the second polymeric film comprises a pattern of microstructures, and wherein the microstructures contact an exposed surface of at least a portion of the structures on the major surface of the first polymeric film; hardening the structures to form an inverse pattern of microstructures in the exposed surfaces of the structures; and forming a plurality of cavities in the polymeric material to form the dental appliance, wherein the dental appliance includes an arrangement of cavities are configured to receive one or more teeth.

In another aspect, the present disclosure is directed to a method for making a dental appliance configured to position at least one tooth of a patient. The method includes applying a transfer layer on a major surface of a first polymeric film substrate, wherein the transfer layer incudes a polymeric resin matrix and at least one therapeutic compound; printing a release composition on the transfer layer to form a pattern of discrete release structures thereon; at least partially hardening the release structures; contacting the first polymeric film substrate with a major surface of a second polymeric film substrate such that the release structures contact the major surface of the second polymeric film substrate; removing the first polymeric film substrate from the second polymeric film substrate such that portions of the transfer layer uncovered by the release structures transfer from the major surface of the first polymeric film substrate to the major surface of the second polymeric film substrate; and forming a plurality of cavities in the second polymeric film substrate to form the dental appliance, wherein the dental appliance includes an arrangement of cavities are configured to receive one or more teeth.

In another aspect, the present disclosure is directed to a dental appliance, including a polymeric substrate with a plurality of cavities for receiving one or more teeth; and an array of printed structures on the substrate, wherein the printed structures include a therapeutic agent, and wherein the structures have an average feature size of about 25 μm to about 1000 μm and an average feature spacing of about 100 μm to about 2000 μm, and wherein the dental appliance has a visible light transmission of about 75% to about 99%.

In another aspect, the present disclosure is directed to a dental appliance including a polymeric substrate with a plurality of cavities for receiving one or more teeth; and an array of printed structures on the substrate, wherein the printed structures include a therapeutic agent, and wherein the structures have an average feature size of about 25 μm to about 1000 μm and an average feature spacing of about 100 μm to about 2000 μm, and wherein the dental appliance has a visible light transmission of about 75% to about 99%.

In another aspect, the present disclosure is directed to a method of dental treatment, including: printing with flexographic or screen printing an array of discrete liquid regions of a hardenable resin composition on a major surface of a polymeric film substrate, wherein the hardenable composition includes a therapeutic agent; at least partially hardening the discrete liquid regions to form a pixelated array of structures on the major surface of the substrate, wherein the structures have an average feature size of about 25 μm to about 1000 μm and an average feature spacing of about 100 μm to about 2000 μm; thermoforming the substrate to form a dental appliance comprising a plurality of cavities for receiving one or more teeth, wherein the dental appliance is transparent to visible light; and releasing the therapeutic agents into the mouth of a patient.

In another aspect, the present disclosure is directed to a method for making a dental appliance configured to position at least one tooth of a patient, the method including: printing a hardenable liquid resin composition on a major surface of a polymeric material to form a pattern of discrete unhardened liquid regions thereon; at least partially hardening the unhardened liquid regions to form a corresponding first pattern of structures on the major surface of the polymeric material, wherein the structures have a characteristic cross-sectional dimension of about 25 microns to about 1 mm, and a feature spacing of about 100 microns to about 2000 microns; and forming a plurality of cavities in the polymeric material to form the dental appliance, wherein the dental appliance includes an arrangement of cavities are configured to receive one or more teeth, and wherein the dental appliance including a second pattern of structures different from the first pattern.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6A-A and B-A are photographs of the dental appliances of the Comparative Example with continuous high area coverage color prints on typodont arches produced via flexographic and inkjet printing (low magnification). FIGS. 6A-B and B-B are the high magnification images of the same dental appliances showing in distortion of the print due to the disproportionate stretching of plastic during thermoforming.

Like symbols in the drawings indicate like elements.

DETAILED DESCRIPTION

Figure 1:
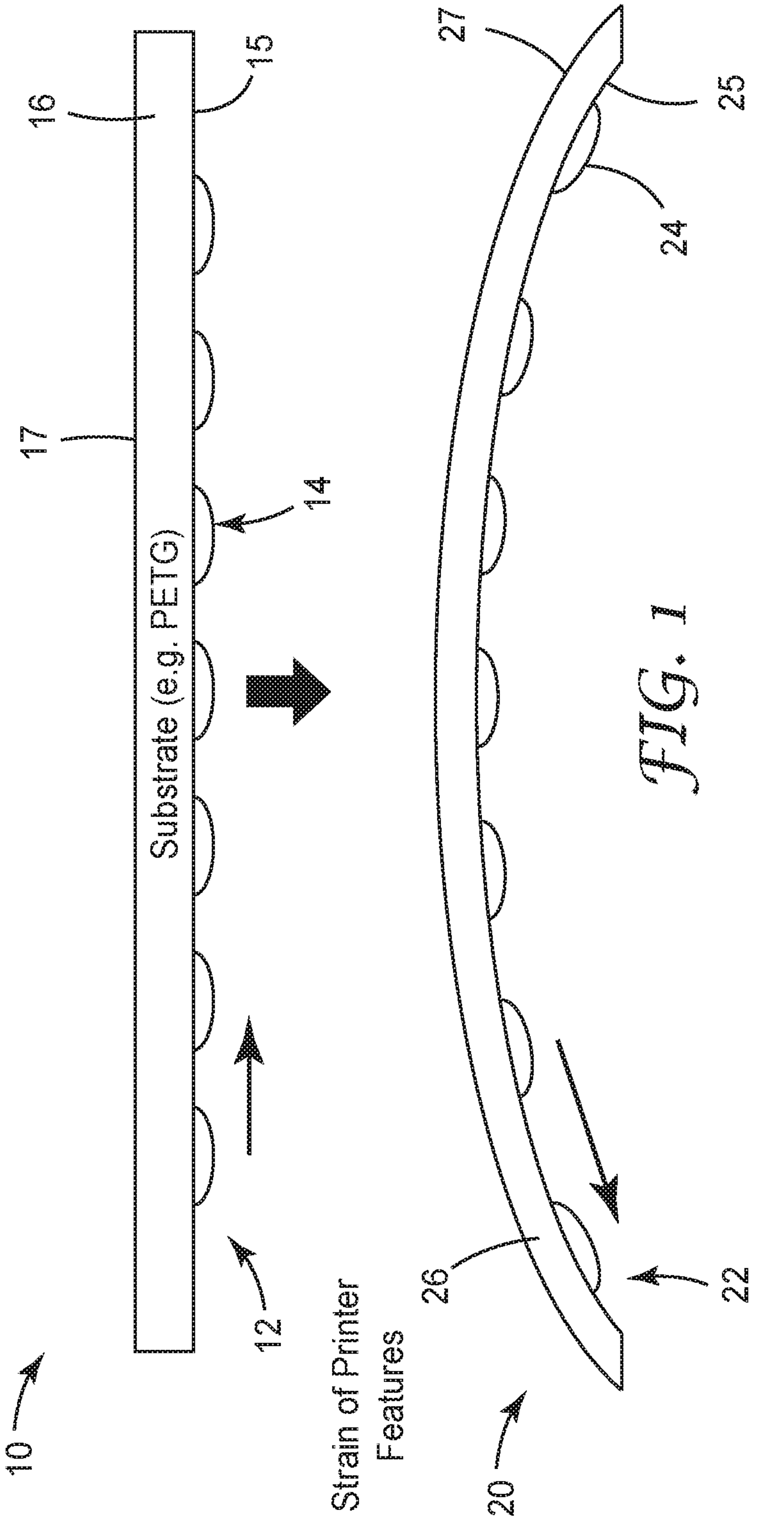
FIG. 1 is a schematic cross-sectional view of a direct printing process for making structures on a dental appliance.

FIG. 1 is a schematic depiction of a direct patterning process 10 that may be used to form a dental appliance, which is also referred to herein as an orthodontic aligner tray or retainer tray. In a first step a pixelated pattern 12 including discrete unhardened liquid regions 14 of a hardenable liquid composition are printed on at least one major surface 15, 17 of a polymeric film substrate 16. Any suitable printing technique may be used, and examples include, but are not limited to, screen printing, flexographic printing, ink jet printing, gravure printing, pad printing, and combinations thereof. In the present application the term discrete refers to individual liquid regions that are free-standing, separate and distinct from one another, and do not share an edge-to-edge border. As will be described in more detail below, the liquid regions 14 are subsequently hardened to form a pattern 22 of discrete structures 24 on either or both major surfaces 25, 27 of the substrate 26. The pattern 22 of discrete structures 24 substantially corresponds to the pattern 12 of discrete liquid regions 14. The liquid regions 14 may be hardened to form the structures 24 prior to, during, or after, the substrate 16 is formed into a dental appliance 20 that includes a plurality of cavities (not shown in FIG. 1) configured to retain one or more teeth of a patient.

The substrate 16 may be selected from any suitable elastic polymeric material that is moldable to form a dental appliance, and once molded is generally conformable to a patient's teeth. The substrate 16 may be transparent, translucent, or opaque. In some embodiments, the substrate 16 is a clear or substantially transparent polymeric material that may include, for example, one or more of amorphous thermoplastic polymers, semi-crystalline thermoplastic polymers and transparent thermoplastic polymers chosen from polycarbonate, thermoplastic polyurethane, acrylic, polysulfone, polyprolylene, polypropylene/ethylene copolymer, cyclic olefin polymer/copolymer, poly-4-methyl-1-pentene or polyester/polycarbonate copolymer, styrenic polymeric materials, polyamide, polymethylpentene, polyetheretherketone and combinations thereof. In another embodiment, the substrate 16 may be chosen from clear or substantially transparent semi-crystalline thermoplastic, crystalline thermoplastics and composites, such as polyamide, polyethylene terephthalate. polybutylene terephthalate, polyester/polycarbonate copolymer, polyolefin, cyclic olefin polymer, styrenic copolymer, polyetherimide, polyetheretherketone, polyethersulfone, polytrimethylene terephthalate, and mixtures and combinations thereof. In some embodiments, the substrate 16 is a polymeric material chosen from polyethylene terephthalate, polyethylene terephthalate glycol, polycyclohexylenedimethylene terephthalate glycol, and mixtures and combinations thereof. One example of a commercially available material suitable as the elastic polymeric material for the substrate 16, which is not intended to be limiting, is polyethylene terephthalate (polyester with glycol additive (PETg)). Suitable PETg resins can be obtained from various commercial suppliers such as, for example, Eastman Chemical, Kingsport, Tenn; SK Chemicals, Irvine, Calif.; DowDuPont, Midland, Mich.; Pacur, Oshkosh, Wis.; and Scheu Dental Tech, Iserlohn, Germany.

The substrate 16 may be made of a single polymeric material or may include multiple layers of the same or different polymeric materials.

In various embodiments, the substrate 16 has a thickness of less than 1 mm, but varying thicknesses may be used depending on the application of the orthodontic appliance 100. In various embodiments, the substrate 16 has a thickness of about 50 μm to about 3,000 μm, or about 300 μm to about 2,000 μm, or about 500 μm to about 1,000 μm, or about 600 μm to about 700 μm.

In one embodiment, the substrate 16 is a substantially transparent polymeric material, which in this application refers to materials that pass light in the wavelength region sensitive to the human eye (about 0.4 micrometers (μm) to about 0.75 μm) while rejecting light in other regions of the electromagnetic spectrum. In some embodiments, the substrate 16 is substantially transparent to visible light of about 400 nm to about 750 nm at a thickness of about 50 μm to about 1000 μm. In various embodiments, the visible light transmission through the combined thickness of the substrate is at least about 75%, or about 85%, or about 90%, or about 95%, or about 99%. In various embodiments, the substrate 16 has a haze of about 0% to about 20%, or about 1% to about 10%, or about 3% to about 8%. In various embodiments, the substrate 16 has a clarity of about 75% to about 100%, or about 85% to about 99%, or about 90% to about 95%. The optical properties of the substrate can be measured using standards such as ASTM D1003 by a wide variety of optical instruments such as, for example, those available under the trade designation Haze Guard from BYK Gardner, Columbia, Md.

In some embodiments, the major surface of the polymeric sheet to which the liquid regions 14 are applied may optionally be chemically or mechanically treated prior to applying the hardenable liquid composition to, for example, enhance adhesion between the surface 15, 17 and the liquid regions 14. Examples of suitable treatments include, but are not limited to, corona treatments, ozonation, application of silane coupling agents, application of primers, application of adhesives, and combinations thereof.

In various embodiments, the discrete liquid regions 14 may form a continuous or a discontinuous array over the surfaces 15 or 17, or both. For example, some areas of the surfaces 15, 17 may be free of the liquid regions 14, while other areas have a dense arrangement of liquid regions 14. In another example embodiment, various areas of the surfaces 15, 17 may have liquid regions 14 with varying shapes and feature spacings. The sizes and shapes of the liquid regions 14 can vary widely, and the liquid regions 14 need not be the same size or shape in a particular area of the surfaces 15, 17, or over the entire surfaces 15, 17. For example, in some embodiments, the liquid regions 14 can form an aesthetic pattern, an image, a logo, a bar code, a QR code, and the like. In other embodiments, the liquid regions 14 simply form an array of dots over all or a portion of either or both of the surfaces 15, 17. In some embodiments, the liquid regions 14 may be applied on the substrate 16 in an array with sizes and feature spacings such that the visible light transmission through the thickness of the substrate and the liquid regions is at least about 75%, or about 85%, or about 90%, or about 95%. In various embodiments, which are provided as non-limiting examples, the liquid regions are applied to maintain sufficient substrate transparency, and at least about 20% of the surface 15 is free of liquid regions, or about 50%, about 75%, about 90%, or about 98%.

In various embodiments, areas of the surfaces 15, 17 may include liquid regions 14 of differing sizes, shapes or compositions, and in some embodiments, two or more different configurations of the liquid regions 14 can be deposited on at least a portion of the surfaces 15, 17. For example, liquid regions 14 with a first shape or size can be disposed on a first area of the surface 15, and liquid regions 14 with a second shape or size, different from the first shape or size, can be disposed in a second area of the surface 15.

In various embodiments, the liquid regions 14 can have varying cross-sectional shapes, which can be the same or different from the cross-sectional shapes of liquid regions in other areas on the surfaces 15, 17. In some embodiments, the liquid regions 14 are have a substantially hemispherical cross-sectional shape, and appear as arrays of dots on the surfaces 15, 17, and in other embodiments may have any cross-sectional shape such as squares, triangles, rectangles, and the like. In other embodiments, the liquid regions 14 can have an appearance in a plan view that is different from the cross-sectional shape. For example, in some embodiments as discussed in more detail below, the liquid regions can be further structured after the liquid regions are formed so that the plan view shape is different from the cross-sectional shape. In one example that is not intended to be limiting, the liquid regions 14 can appear circular in the plan view, but could have a cross-sectional shape of a triangle The liquid regions 14 can be uniformly arranged or randomly distributed in some areas on the surfaces 15, 17, and randomly distributed on other areas if the surfaces 15, 17. For example, the liquid regions 14 can be arranged uniformly on the first surface 15 and distributed randomly on the second major surface 17. In various embodiments, the height of the liquid regions 14 above the surfaces 15, 17, the width and length on the surface 15, 17, or both, can vary between areas of the surfaces 15, 17, and even can vary within a selected area.

In some embodiments, which are not intended to be limiting, the liquid regions 14 include a base having at least one microscale cross-sectional dimension. In various example embodiments, the liquid regions 14 can include a base on the surfaces 15, 17 having cross-sectional dimensions of about 25 μm to about 1000 μm, or about 100 μm to about 300 μm, or about 150 μm to about 250 μm.

In some embodiments, which are provided as an example, the liquid regions 14 have a feature spacing (i.e., the center to center distance between adjacent liquid regions) of about 100 μm to about 2000 μm or about 750 μm to about 1500 μm, or about 800 μm to about 1300 μm. In some embodiments, which are not intended to be limiting, the liquid regions 14 are present on the surfaces 15, 17 at about 10 to about 5000 dots per inch (dpi), or about 25 dpi to about 1000 dpi, or about 100 dpi to about 300 dpi.

In some example embodiments, the liquid regions 14 have a characteristic length of about 250 μm to about 2500 μm, or about 500 μm to about 1500 μm, or about 750 μm to about 1400 μm. In some example embodiments, the liquid regions 14 have an aspect ratio of about 0.0005 to about 0.01, or about 0.005 to about 0.05, or about 0.10 to about 0.20. In the present application, the term aspect ratio means a ratio of the height to the width of the discrete features.

The liquid regions 14 are formed from a hardenable liquid resin composition, which in some embodiments may further include at least one therapeutic agent in the resin matrix. In this application the term therapeutic agent refers to compounds that that can have a beneficial effect in the mouth of the patient. Examples of suitable therapeutic agents for the hardenable resin composition include, but are not limited to, fluoride sources, whitening agents, anti-cavity agents (e.g., xylitol), re-mineralizing agents (e.g., calcium phosphate compounds), enzymes, breath fresheners, anesthetics, clotting agents, acid neutralizers and pH control agents, ion-recharging agents, chemotherapeutic agents, immune response modifiers, thixotropes, polyols, anti-inflammatory agents, antimicrobial agents, antifungal agents, agents for treating xerostomia, desensitizers, and the like, of the type often used in dental compositions. Combinations of any of the above therapeutic agents may be used.

In some embodiments, suitable therapeutic agents include re-mineralizing agents such as calcium, phosphorous, and fluoride compounds.

For example, in some embodiments, suitable calcium compounds in the hardenable liquid resin composition include, but are not limited to, calcium chloride, calcium carbonate, calcium caseinate, calcium chloride, calcium citrate, calcium glubionate, calcium gluceptate, calcium glycerophosphate, calcium gluconate, calcium hydroxide, calcium hydroxyapatite, calcium lactate, calcium oxalate, calcium oxide, calcium pantothenate, calcium phosphate, calcium polycarbophil, calcium propionate, calcium pyrophosphate, calcium sulfate, and mixtures and combinations thereof. These compounds have been found to minimize demineralization of calcium hydroxyapatite at the surface of the tooth of a patient.

In some embodiments, the tooth re-mineralizing compounds in the hardenable liquid resin composition include phosphate compounds. Suitable phosphate compounds include, but are not limited to, aluminum phosphate, bone phosphate, calcium phosphate, calcium orthophosphate, calcium phosphate dibasic anhydrous, calcium phosphate-bone ash, calcium phosphate dibasic dihydrate, calcium phosphate dibasic anhydrous, calcium phosphate dibasic dihydrate, calcium phosphate tribasic, dibasic calcium phosphate dihydrate, dicalcium phosphate, neutral calcium phosphate, precipitated calcium phosphate, tertiary calcium phosphate, tricalcium phosphate, whitlockite, magnesium phosphate, potassium phosphate, dibasic potassium phosphate, dipotassium hydrogen orthophosphate, dipotassium monophosphate, dipotassium phosphate, monobasic potassium phosphate, potassium acid phosphate, potassium biphosphate, potassium dihydrogen orthophosphate, potassium hydrogen phosphate, sodium phosphate, anhydrous sodium phosphate, dibasic sodium phosphate, disodium hydrogen orthophosphate, disodium hydrogen orthophosphate dodecahydrate, disodium hydrogen phosphate, disodium phosphate, and sodium orthophosphate.

Fluoride compounds incorporated into the mineral surface of a tooth help inhibit the demineralization of enamel and protect the tooth. Fluoride compounds absorbed into mineral surfaces of a tooth attract calcium and phosphate ions from saliva, or other sources, which results in the formation of fluorapatite and protects the tooth against demineralization. While not wishing to be bound by any theory, currently available evidence indicates that fluorapatite exhibits lower solubility than naturally occurring hydroxyapatite, which can help resist the inevitable acid challenge that teeth face daily.

Orthodontic patients are considered high risk for cavities over the course of their treatment. Commercial fluoride varnishes are very sticky by design and typically last a few hours on the enamel once applied. For an orthodontic patient wearing a dental appliance such as an aligner tray, this is undesirable since the varnish can interfere with the fit of the aligners on the arches of the patient, as well as adhere to the plastic that the aligners are made from and permanently warp or deform them. In one embodiment, for example, the liquid regions on the structured surface 16 can be configured to deliver, when subsequently hardened, beneficial fluoride over a typical wear time for an alignment tray set (for example, 7 days), without compromising the fit of the alignment tray for the patient or ruining the polymeric material from which the alignment tray is made.

In some embodiments, the calcium compounds, phosphate compounds, fluoride compounds or combinations thereof, are present in the liquid regions in an amount sufficient such at least one of calcium, phosphate or fluoride can substantially reduce or prevent demineralization on the surface of the teeth of the patient during or exceeding a predetermined wear time.

In another embodiment, the therapeutic agents in the hardenable liquid resin composition include compounds selected to reduce the bacteria on at least one of the surfaces 25, 27 of the dental appliance 20. Suitable antibacterial or biofilm-reducing compounds include, but are not limited to, biocompatible metals and metal oxides $MO_x$ such as silver, silver oxide, copper oxide, gold oxide, zinc oxide, magnesium oxide, titanium oxide, chromium oxide, and mixtures, alloys and combinations thereof.

The liquid regions 14 and corresponding structures 24 can include any antimicrobially effective amount of the metal or the metal oxide $MO_x$. In various embodiments, which are not intended to be limiting, the liquid regions 14 can include less than 100 mg, less than 40 mg, less than 20 mg, or less than 5 mg $MO_x$ per 100 $cm^2$. The metal oxide can include, but is not limited to, silver oxide, copper oxide, gold oxide, zinc oxide, magnesium oxide, titanium oxide, chromium oxide, and mixtures, alloys and combinations thereof. In some embodiments, which are not intended to be limiting, the metal oxide can be chosen from AgCuZnOx, Ag doped ZnOx, Ag doped AZO, Ag doped TiO2, Al doped ZnO, and TiOx.

In some embodiments, the liquid regions 14 and the corresponding structures 24 can include one or more antibacterial agents. Examples of suitable antibacterial agents can include, but are not limited to, aldehydes (glutaraldehyde, phthalaldehyde), salts of phenolics or acids, chlorhexidine or its derivatives (including acid adducts such as acetates, gluconates, chlorides, nitrates, sulfates or carbonates), and combinations thereof.

Non-limiting examples of suitable antibacterial agents for the hardenable liquid resin composition include: zinc salts, zinc oxide, tin salts, tin oxide, benzalkonium chloride, hexitidine, long chain alkyl ammonium or pyridinium salts (e.g., cetypyridinium chloride, tetradecylpyridinium chloride), essential oils (e.g., thymol), furanones, chlorhexidine and salt forms thereof (e.g., chlorhexidine gluconate), sanguinarine, triclosan, stannous chloride, stannous fluoride, octenidine, non-ionic or ionic surfactants (e.g., quaternary ammonium compounds), alcohols (monomeric, polymeric, mono-alcohols, poly-alcohols), aromatic alcohols (e.g., phenol)), antimicrobial peptides (e.g., histatins), bactericins (e.g., nisin), antibiotics (e.g., tetracycline), aldehydes (e.g., glutaraldehyde) inorganic and organic acids (e.g., benzoic acid, salicylic acid, fatty acids, etc.) or their salts, derivatives of such acids such as esters (e.g., p-hydroxybenzoates or other parabens, glycerol esters of fatty acids such as lauricidin), silver compounds, silver salts, silver nanoparticles, peroxides (e.g., hydrogen peroxide), and combinations thereof.

In various embodiments, the therapeutic agents released from the structures 24 can vary between areas on the major surfaces of the dental appliance 20, and even within a single region. For example, the therapeutic agents released by the structures 24 in a first area of the surfaces 25, 27 of the dental appliance 20 can be different from the therapeutic agents released from the structures 24 in a second area of the surfaces 25, 27, e.g., fluoride in the first area and phosphate in the second are. In other examples, the therapeutic agents released from the structures 24 within the first area can differ from one another, e.g., fluoride and phosphate could be released from different structures 24 in the first area. In another embodiment, the therapeutic agents within the structures 24 can be released at a different concentration between regions and within a selected region.

In another embodiment, the therapeutic agents released from the liquid regions 14 and the corresponding structures 24 can be releasable over a predetermined patient wear time of the dental appliance 20. In some examples, the therapeutic agents may be released over a period of seconds, minutes, hours, days, weeks, or months. In addition, different regions of the orthodontic appliance can have therapeutic agents with varying predetermined release periods. For example, one region may have a release period on the order of seconds, and another different region may have a release period on the order of months.

In another embodiment, the liquid regions 14 and the corresponding structures 24 can be configured to absorb and release therapeutic agents. For example, calcium and/or phosphorus can be absorbed from saliva and released over time. In another example, fluoride, calcium, tin, and/or phosphorus can be absorbed from oral care products (e.g., toothpaste and rinse) and released over time.

In another embodiment, the hardened structures 24 can include an elastomeric polymeric material selected to, for example, ease placement and removal of the dental applicant in the mouth of the patient, improve comfort against the teeth or the tissues in the mouth of the patient, or enhance tray-to-dentition contact area leading to lower stress and/or effective force transfer from the dental article 20 for repositioning teeth. In some examples, elastomers can include polyisoprenes, polybutadienes, chloroprene rubbers, butyl rubbers, halogenated butyl rubbers, fluoropolymers, nitriles, ethylene propylene rubbers, ethylene propylene diene rubbers, silicone rubbers, polyacrylic rubbers, fluorosilicones, fluoroelastomers, polyether block amides, cholorsulfinated polyethylenes, and ethylene vinyl acetates.

In another embodiment, the liquid regions 14 or the corresponding structures 24 can be configured to facilitate unhindered flow of salivary fluids and other fluids to enhance and/or maintain hard tissue health. For example, when a tooth surface undergoes demineralization instigated by oral bacteria, dietary choices, xerostomia, etc., the structures 24 can provide open channels for the saliva to remineralize and hydrate the tooth surface.

Referring again to FIG. 1, the liquid regions 14 are printed from a hardenable resin composition including a suitable resin matrix and an optional therapeutic compound incorporated into the resin matrix. In some embodiments, the resin material selected for the resin matrix has a glass transition temperature ($T_g$) higher than the $T_g$ of the substrate 16 on which the liquid regions are applied. In some cases, utilizing a hardenable liquid composition with a resin having a higher $T_g$ than the substrate can reduce or substantially eliminate distortion when the substrate is thermoformed into a dental appliance. In some embodiments, resins with a higher $T_g$ can provide liquid regions 14 with a greater height above a surface 15, 17, a greater particle loading, and combinations thereof.

Suitable resins for the hardenable liquid composition include, but are not limited to, epoxy resins (which contain cationically active epoxy groups), vinyl ether resins (which contain cationically active vinyl ether groups), ethylenically unsaturated compounds (which contain free radically active unsaturated groups, e.g., acrylates and methacrylates), and combinations thereof. Also suitable are polymerizable materials that contain both a cationically active functional group and a free radically active functional group in a single compound. Examples include epoxy-functional (meth)acrylates.

As used herein, ethylenically unsaturated compounds with acid functionality includes monomers, oligomers, and polymers having ethylenic unsaturation and acid and/or acid-precursor functionality. Acid-precursor functionalities include, for example, anhydrides, acid halides, and pyrophosphates. Ethylenically unsaturated compounds with acid functionality include, for example, α,β-unsaturated acidic compounds such as glycerol phosphate mono(meth)acrylates, glycerol phosphate di(meth)acrylates, hydroxyethyl (meth)acrylate (e.g., HEMA) phosphates, bis((meth)acryloxyethyl) phosphate, ((meth)acryloxypropyl) phosphate, bis((meth)acryloxypropyl) phosphate, bis((meth)acryloxy) propyloxy phosphate, (meth)acryloxyhexyl phosphate, bis ((meth)acryloxyhexyl) phosphate, (meth)acryloxyoctyl phosphate, bis((meth)acryloxyoctyl) phosphate, (meth)acryloxydecyl phosphate, bis((meth)acryloxydecyl) phosphate, 10-methacryloyloxydecyl dihydrogen phosphate (MDP monomer), caprolactone methacrylate phosphate, citric acid di- or tri-methacrylates, poly(meth)acrylated oligomaleic acid, poly(meth)acrylated polymaleic acid, poly(meth)acrylated poly(meth)acrylic acid, poly(meth)acrylated polycarboxyl-polyphosphonic acid, poly(meth)acrylated polychlorophosphoric acid, poly(meth)acrylated polysulfonate, poly (meth)acrylated polyboric acid, and the like, may be used as components in the hardenable resin system. Also, monomers, oligomers, and polymers of unsaturated carbonic acids such as (meth)acrylic acids, aromatic (meth)acrylated acids (e.g., methacrylated trimellitic acids), and anhydrides thereof can be used. Some compositions can include an ethylenically unsaturated compound with acid functionality having at least one P—OH moiety.

In some embodiments, the hardenable liquid resin composition may be photopolymerizable. Photopolymerizable compositions may include compounds having free radically active functional groups that may include monomers, oligomers, and polymers having one or more ethylenically unsaturated group. Suitable compounds contain at least one ethylenically unsaturated bond and are capable of undergoing addition polymerization. Such free radically polymerizable compounds include mono-, di- or poly-(meth)acrylates (i.e., acrylates and methacrylates) such as, methyl (meth) acrylate, ethyl acrylate, isopropyl methacrylate, n-hexyl acrylate, stearyl acrylate, allyl acrylate, glycerol triacrylate, ethyleneglycol diacrylate, diethyleneglycol diacrylate, triethyleneglycol dimethacrylate, 1,3-propanediol di(meth) acrylate, trimethylolpropane triacrylate, 1,2,4-butanetriol trimethacrylate, 1,4-cyclohexanediol diacrylate, pentaerythritol tetra(meth)acrylate, sorbitol hexacrylate, tetrahydrofurfuryl (meth)acrylate, bis[1-(2-acryloxy)]-p-ethoxyphenyldimethylmethane, bis[1-(3-acryloxy-2-hydroxy)]-p-propoxyphenyldimethylmethane, ethoxylated bisphenolA di(meth)acrylate, and trishydroxyethyl-isocyanurate trimethacrylate; (meth)acrylamides (i.e., acrylamides and methacrylamides) such as (meth)acrylamide, methylene bis-(meth)acrylamide, and diacetone (meth)acrylamide; urethane (meth)acrylates; the bis-(meth)acrylates of polyethylene glycols (e.g., molecular weight 200-500), copolymerizable mixtures of acrylated monomers such as those in U.S. Pat. No. 4,652,274 (Boettcher et al.), acrylated oligomers such as those of U.S. Pat. No. 4,642,126 (Zador et al.), and poly(ethylenically unsaturated) carbamoyl isocyanurates such as those disclosed in U.S. Pat. No. 4,648,843 (Mitra); and vinyl compounds such as styrene, diallyl phthalate, divinyl succinate, divinyl adipate and divinyl phthalate. Other suitable free radically polymerizable compounds include siloxane-functional (meth)acrylates as disclosed, for example, in WO-00/38619 (Guggenberger et al.), WO-01/92271 (Weinmann et al.), WO-01/07444 (Guggenberger et al.), WO-00/42092 (Guggenberger et al.) and fluoropolymer-functional (meth)acrylates as disclosed, for example, in U.S. Pat. No. 5,076,844 (Fock et al.), U.S. Pat. No. 4,356,296 (Griffith et al.), EP-0373 384 (Wagenknecht et al.), EP-0201 031 (Reiners et al.), and EP-0201 778 (Reiners et al.). Mixtures of two or more free radically polymerizable compounds can be used if desired.

The polymerizable component in the hardenable liquid resin composition may also contain hydroxyl groups and free radically active functional groups in a single molecule. Examples of such materials include hydroxyalkyl (meth) acrylates, such as 2-hydroxyethyl (meth)acrylate and 2-hydroxypropyl (meth)acrylate; glycerol mono- or di-(meth) acrylate; trimethylolpropane mono- or di-(meth)acrylate; pentaerythritol mono-, di-, and tri-(meth)acrylate; sorbitol mono-, di-, tri-, tetra-, or penta-(meth)acrylate; and 2,2-bis [4-(2-hydroxy-3-methacryloxypropoxy)phenyl]propane (bisGMA). Suitable ethylenically unsaturated compounds are also available from a wide variety of commercial sources, such as Sigma-Aldrich, St. Louis. Mixtures of ethylenically unsaturated compounds can be used if desired.

Particularly useful photopolymerizable components for use in the hardenable liquid resin composition include PEGDMA (polyethyleneglycol dimethacrylate having a molecular weight of approximately 400), bisGMA, UDMA (urethane dimethacrylate), GDMA (glycerol dimethacrylate), TEGDMA (triethyleneglycol dimethacrylate), bisEMA6 as described in U.S. Pat. No. 6,030,606 (Holmes), and NPGDMA (neopentylglycol dimethacrylate). Various combinations of the polymerizable components can be used if desired.

For example, some embodiments of the resin composition can include approximately at least 10, 20, 30, 40, 50, 60, 70, 80, 85, 90, 92, 95, 96, 98 or 99% by weight of photopolymerizable components based on the total weight of the composition. In some embodiments, the resin composition can include approximately less than 10, 20, 30, 40, 50, 60, 70, 80, 85, 90, 92, 95, 96, 98 or 99% by weight of photopolymerizable components based on the total weight of the composition. In some embodiments, the resin composition can include a range, e.g., between approximately 10% by weight to approximately 99% by weight, between approximately 10% by weight to approximately 50% by weight, between approximately 50% by weight to approximately 99% by weight, or between approximately 40% by weight to approximately 70% by weight of photopolymerizable components based on the total weight of the composition.

In one embodiment, the hardenable resin composition, such as photopolymerizable components of one or more ethylenically unsaturated compounds, includes approximately at least 10, 15, 20, 25, 30, or 40% by weight based on the total weight of the resin composition. In some embodiments, the resin composition, such as photopolymerizable components of one or more ethylenically unsaturated compounds, includes approximately less than 60, 70, 75, 80, 85, or 90% by weight based on the total weight of the resin composition. In other embodiments, the resin composition, such as photopolymerizable components of one or more ethylenically unsaturated compounds, includes a range, e.g., between approximately 10% by weight to approximately 90% by weight, between approximately 10% by weight to approximately 40% by weight, between approximately 60% by weight to approximately 90% by weight, or between approximately 40% by weight to approximately 70% by weight based on the total weight of the resin composition.

In one embodiment, the hardenable resin composition, such as photopolymerizable components of one or more ethylenically unsaturated compounds with acid functionality and an initiator system, includes approximately at least 10, 15, 20, 25, 30, or 40% by weight based on the total weight of the resin composition. In some embodiments, the resin composition, such as photopolymerizable components of one or more ethylenically unsaturated compounds with acid functionality and an initiator system, includes approximately less than 60, 70, 75, 80, 85, or 90% by weight based on the total weight of the resin composition. In other embodiments, the resin composition, such as photopolymerizable components of one or more ethylenically unsaturated compounds with acid functionality and an initiator system, includes a range, e.g., between approximately 10% by weight to approximately 90% by weight, between approximately 10% by weight to approximately 40% by weight, between approximately 60% by weight to approximately 90% by weight, or between approximately 40% by weight to approximately 70% by weight based on the total weight of the resin composition.

Suitable photoinitiators (i.e., photoinitiator systems that include one or more compounds) for polymerizing free radically photopolymerizable resin compositions include binary and tertiary systems. Typical tertiary photoinitiators include an iodonium salt, a photosensitizer, and an electron donor compound as described in U.S. Pat. No. 5,545,676 (Palazzotto et al.). Iodonium salts can include the diaryl iodonium salts, e.g., diphenyliodonium chloride, diphenyliodonium hexafluorophosphate, diphenyliodonium tetrafluoroborate, and tolylcumyliodonium tetrakis(pentafluorophenyl)borate. Photosensitizers can include monoketones and diketones that absorb some light within a range of 400 nm to 520 nm, or 450 nm to 500 nm. Compounds can include alpha diketones that have some light absorption within a range of 400 nm to 520 nm or of 450 nm to 500 nm. Compounds can include camphorquinone, benzil, furil, 3,3,6,6-tetramethylcyclohexanedione, phenanthraquinone, 1-phenyl-1,2-propanedione and other 1-aryl-2-alkyl-1,2-ethanediones, and cyclic alpha diketones. Electron donor compounds can include substituted amines, e.g., ethyl dimethylaminobenzoate. Other suitable tertiary photoinitiator systems useful for photopolymerizing cationically polymerizable resins are described, for example, in U.S. Pat. No. 6,765,036 (Dede et al.).

Other suitable photoinitiators for polymerizing free radically photopolymerizable compositions include the class of phosphine oxides that typically have a functional wavelength range of 380 nm to 1200 nm. Phosphine oxide free radical initiators with a functional wavelength range of 380 nm to 450 nm can include acyl and bisacyl phosphine oxides such as those described in U.S. Pat. No. 4,298,738 (Lechtken et al.), U.S. Pat. No. 4,324,744 (Lechtken et al.), U.S. Pat. No. 4,385,109 (Lechtken et al.), U.S. Pat. No. 4,710,523 (Lechtken et al.), and U.S. Pat. No. 4,737,593 (Ellrich et al.), U.S. Pat. No. 6,251,963 (Kohler et al.); and EP Application No. 0 173 567 A2 (Ying).

In one embodiment, the hardenable resin composition includes an effective amount from approximately 0.1 wt % to approximately 5.0 wt % of one or more photoinitiators, based on the total weight of the resin composition.

The hardenable resin compositions can also contain fillers. Fillers may be selected from one or more of a wide variety of materials suitable for incorporation in compositions used for dental applications, such as fillers currently used in dental restorative compositions, pigments, and the like.

The filler can be finely divided. The filler can have a unimodial or polymodial (e.g., bimodal) particle size distribution. In some examples, the maximum particle size (the largest dimension of a particle, typically, the diameter) of the filler can be less than 20 micrometers, less than 10 micrometers, or less than 5 micrometers. In some examples, the average particle size of the filler can be less than 0.1 micrometers or less than 0.075 micrometer.

The filler can be an inorganic material. It can also be a crosslinked organic material that is insoluble in the resin system and is optionally filled with inorganic filler. The filler should in any event be nontoxic and suitable for use in the mouth. The filler can be radiopaque or radiolucent, and in some embodiments is substantially insoluble in water.

Examples of suitable inorganic fillers are naturally occurring or synthetic materials including, but not limited to: quartz; nitrides (e.g., silicon nitride); glasses derived from, for example, Zr, Sr, Ce, Sb, Sn, Ba, Zn, and Al; feldspar; borosilicate glass; kaolin; talc; titania; pigments; low Mohs hardness fillers such as those described in U.S. Pat. No. 4,695,251 (Randklev); and submicron silica particles (e.g., pyrogenic silicas such as those available under the trade designations AEROSIL, including "OX 50," "130," "150" and "200" silicas from Degussa Corp., Akron, Ohio and CAB-O-SIL M5 silica from Cabot Corp., Tuscola, Ill.). Examples of suitable organic filler particles include filled or unfilled pulverized polycarbonates, polyepoxides, and the like.

Non-acid-reactive filler particles can include quartz, submicron silica, and non-vitreous microparticles of the type described in U.S. Pat. No. 4,503,169 (Randklev). Mixtures of these non-acid-reactive fillers are also contemplated, as well as combination fillers made from organic and inorganic materials. In some embodiments, the filler can be silane-treated zirconia-silica (Zr—Si).

For some embodiments that include filler, the compositions can include at least 1% by weight, at least 2% by weight, and at least 5% by weight filler, based on the total weight of the composition.

The hardenable liquid resin composition can also include a solvent or a liquid carrier, which can vary widely. In some embodiments, the solvents and liquid carriers are aqueous, or consist of water.

In some embodiments, the hardenable resin composition includes less than about 1% by weight of optional additives such as, for example, preservatives (for example BHT), flavoring agents, indicators, dyes, pigments, inhibitors, accelerators, viscosity modifiers, wetting agents, buffering agents, radical and cationic stabilizers (for example BHT), and the like, based on the total weight of the resin composition.

The liquid regions 14 can be applied on the surfaces 15, 17 by any suitable printing technique. In some non-limiting examples, screen printing is a printing technique in which a mesh is used to transfer a liquid composition, referred to as an ink, onto a substrate, except in areas made impermeable to the ink by a blocking stencil. A blade or squeegee is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed. One color is printed at a time, so several screens can be used to produce a multi-colored image or design. Screen printing is particularly useful in forming liquid regions 14 with varying heights or spacings above the surfaces 15, 17. For example, in some embodiments the spacing of apertures in the screen, or the thickness of the screen, or both, can be varied to form arrays of liquid regions with corresponding spacings or heights above the surfaces 15, 17.

In another non-limiting example, a flexographic print is made by creating a positive mirrored master of the required image as a 3D relief in a rubber or polymeric material, which is referred to as a flexographic printing plate. The image areas on the flexographic printing plate are raised above the non-image areas on the plate. Printing ink is transferred to the image areas of the flexographic plate via an anilox roll (composed of cells filled with ink, usually by a blading ink into the anilox roll cells), and then the ink is transferred to the substrate by contacting the "inked" flexographic plate to the substrate. Ink is only transferred from the relief features of the flexographic plate to the substrate.

Referring again to FIG. 1, as noted above, after printing the liquid regions 14 are subsequently at least partially hardened to form a pattern 22 of discrete structures 24 on either or both major surfaces 25, 27 of the substrate 26. The pattern 22 of the discrete structures 24 substantially corresponds to the pattern 12 of discrete liquid regions 14.

As shown schematically in FIG. 1, a plurality of cavities may then be formed in the substrate 16 to form the orthodontic appliance 20, wherein the cavities are configured to receive one or more teeth. The cavities may be formed by any suitable technique, including thermoforming, laser processing, chemical or physical etching, and combinations thereof. The liquid regions 14 may be hardened to form the structures 24 prior to, during, or after, the substrate 16 is formed into the dental appliance 20.

In some embodiments, the cavities are formed in the sheet of polymeric material 16 under processing conditions such that the pattern 22 and the structures 24 are not substantially distorted. For example, in some embodiments, the substrate 16 may be thermoformed at a temperature and pressure which distorts the structures 24 by less than about 100%, or less than about 50%, in any dimension (for example, diameter, height, and the like). In some embodiments, the substrate 16 may be thermoformed at a temperature and a pressure such that an image formed by the array of structures 22 is not substantially distorted, which means that the image is still recognizable at a normal viewing distance. In some embodiments, the conditions in the thermoforming step may be utilized to change a first pattern of the structures 24 into a second pattern of structures 24 different from the first pattern.

Figure 2:
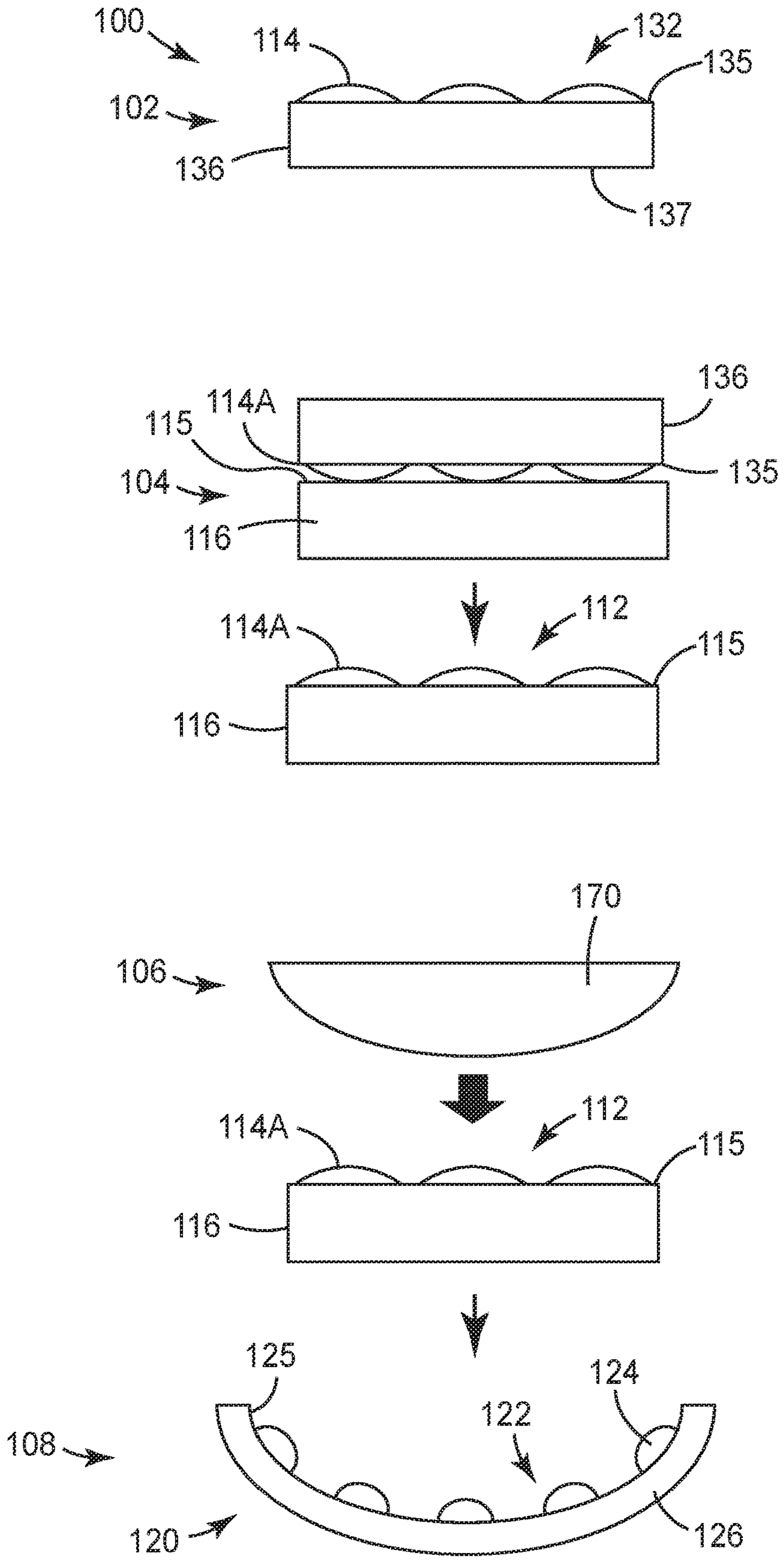
FIG. 2 is a schematic cross-sectional view of an indirect printing process for making structures on a dental appliance.

In an alternative embodiment, an indirect printing process 100 depicted schematically in FIG. 2 may be used to form a pattern of liquid regions on a substrate. In step 102, a pixelated pattern 132 including discrete liquid regions 114 of a hardenable liquid composition is printed on at least one major release surface 135, 137 of a substrate 136 by a suitable printing process such as, for example, screen printing, flexographic printing, and combinations thereof, as described in detail above.

The release surface 135 may be selected from any material from which the liquid regions 114 can release and cleanly transfer from the surface 135 to another substrate. In some embodiments, the release surface 135 is a surface of a low surface energy material such as, for example, a silicone. Silicone acrylates have been found to be particularly suitable. In another embodiment, the release surface 135 may include a release layer of a low surface energy material on a support (not shown in FIG. 2) such as, for example, a silicone layer overlying a paper support. In another embodiment, the release surface 135 may be a surface of a polymeric film. In some embodiments, the release properties of the surface of the polymeric film can optionally be chemically treated or modified by ozonation, corona discharge, application of silane coupling agents, application of primers, and combinations thereof, as needed for a particular application.

Referring now to step 104 of FIG. 2, the liquid regions 114 are at least partially hardened, or fully hardened to form structures 114A, and the release substrate 136 is applied to a substrate 116 such that the structures 114A contact a surface 115 of a substrate 116. In various embodiments, the release substrate 136 may be laminated to a polymeric film substrate 116, or a polymeric film substrate may be coated onto the release substrate 136.

The release substrate 136 is then peeled away and removed so that the structures 114A cleanly transfer from the release surface 135 to the surface 115 to form a pixelated pattern 112 of structures 114A thereon substantially corresponding to the pattern 132. The lamination step 104 may optionally include at least one of heating or pressure to facilitate the transfer of the at least partially hardened liquid regions 114A from the release surface 135 to the surface 115.

In steps 106 and 108, the substrate 116 including the pattern of structures 114A is contacted with a thermal mold 170 and formed into a dental appliance 120 that includes a plurality of cavities (not shown in FIG. 2) configured to retain one or more teeth of a patient. Once released from the mold 170, the dental appliance 120 includes a pattern 122 of discrete structures 124 on a surface 125 of a substrate 126. The pattern 122 of discrete structures 124 corresponds to the pattern 112 of discrete liquid regions 114 and structures 114A. When contacted with the thermal mold 170, the structures 114A are preferably sufficiently hardened such that the liquid regions 114A do not split between the mold 170 and surface 125 of the substrate 126.

Figure 3:
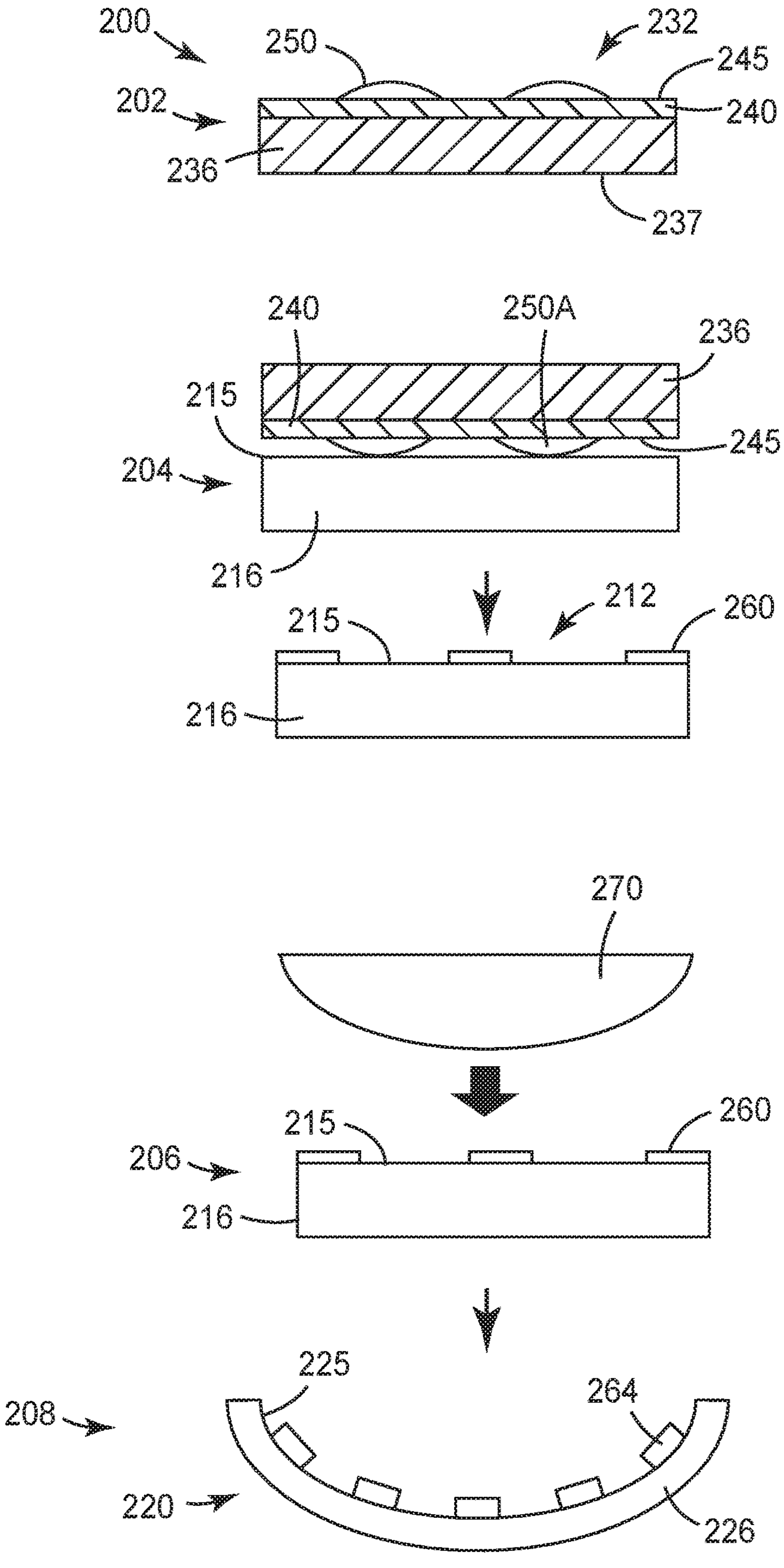
FIG. 3 is a schematic cross-sectional view of an indirect printing process for making structures on a dental appliance.

In another embodiment, an indirect printing process 200 depicted schematically in FIG. 3 may be used to form a pattern of liquid regions on a substrate. In step 202, a pixelated pattern 232 including discrete liquid regions 250 of a release material are applied to a major surface 245 of a transfer layer 240 on a transfer substrate 236 by at least one suitable printing process as described in detail above. The transfer layer 240 includes a polymeric resin matrix and at least one optional therapeutic compound as described in detail above.

As shown in step 204 of FIG. 3, after the liquid regions 250 are at least partially hardened to form release structures 250A, the transfer substrate 236 is contacted with a polymeric film substrate 216 such that the release structures 250A contact and transfer to a major surface 215 thereof. The lamination step 204 may optionally include at least one of heating or pressure to facilitate the transfer of the portions of the transfer layer 240 from the surface 245 to the surface 215. In another embodiment (not shown in FIG. 3), the polymeric film substrate 216 may be coated onto the transfer substrate 236, thereby transferring the release structures 250A to the surface 215 of the substrate 216.

The transfer substrate 236 is then peeled away so that the portions of the transfer layer 240 not overlain by the release structures 250A transfer to the surface 215 of the substrate 216 to form a pixelated pattern 212 of discrete structures 260. Substantially none of the transfer layer 240 is transferred to the surface 215 in regions occupied by the release structures 250A. The pixelated pattern 212 on the surface 215 of the substrate 216 substantially corresponds to an inverse of the pattern 232 of the release structures 250A. In steps 206 and 208, the substrate 216 including the pattern 212 of structures 260 is contacted with a heated mold 270 and formed into a dental appliance 220 that includes a plurality of cavities (not shown in FIG. 3) configured to retain one or more teeth of a patient. Once released from the mold 270, the dental appliance 220 includes a pattern 212 of discrete structures 264 on a surface 225 of a substrate 226. The pattern 212 of discrete structures 264 corresponds to the pattern 212 of structures 260. The pixelated structures 260 may be hardened to form the structures 264 prior to, during, or after, the substrate 216 is formed into the dental appliance 220.

Figure 4:
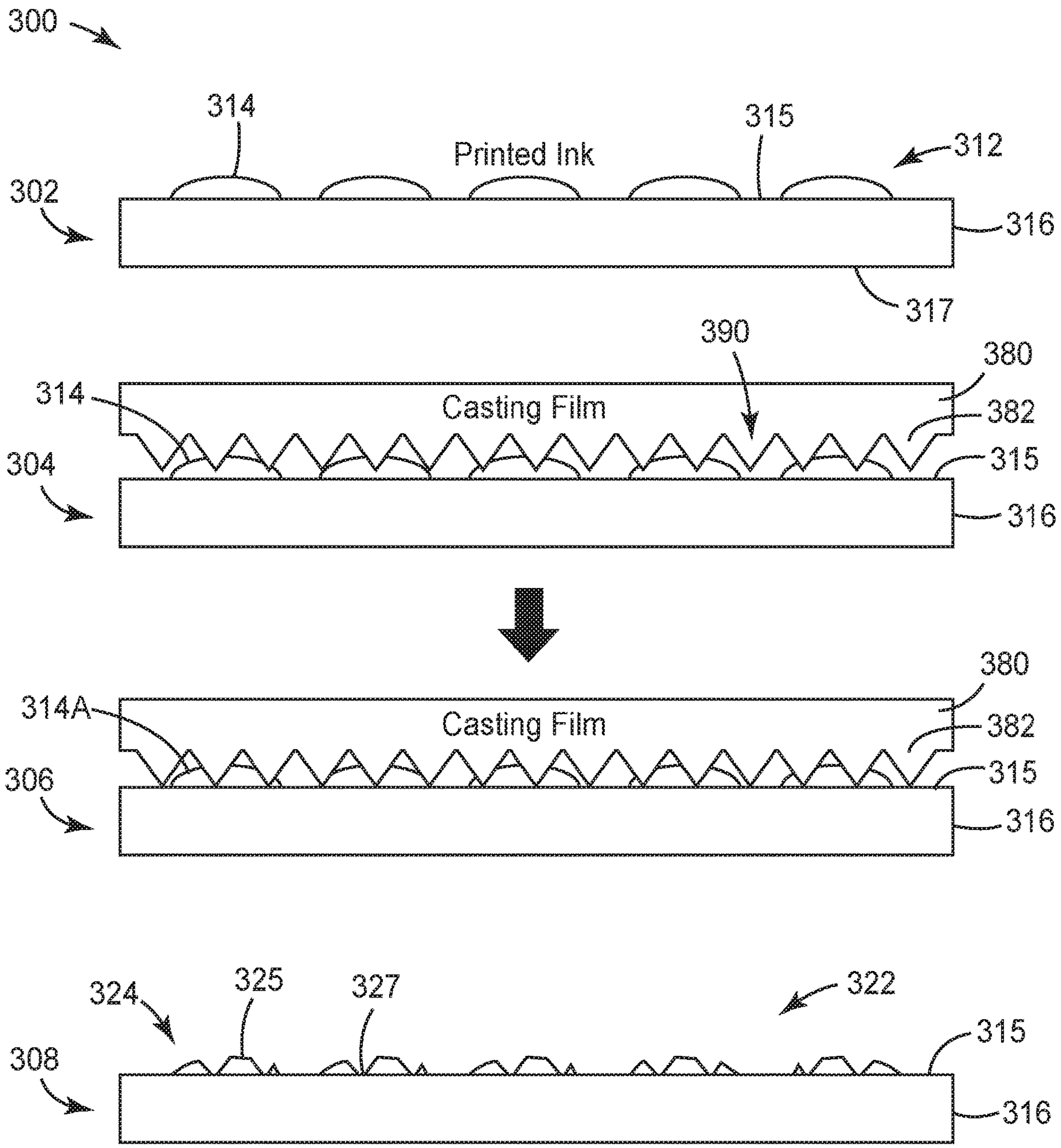
FIG. 4 is a schematic cross-sectional view of a direct printing process for making structures on a dental appliance, wherein the structures have a microstructured surface.

FIG. 4 is a schematic depiction of another embodiment of a direct patterning process 300 that may be used to form a dental appliance. In a first step 302 a pixelated pattern 312 including discrete liquid regions 314 of a hardenable liquid resin composition as described above is applied to at least one major surface 315, 317 of a substrate 316 by at least one suitable printing process. As above, suitable examples include, but are not limited to, screen printing, flexographic printing, ink jet printing, gravure printing, pad printing, and combinations thereof.

In a second step 304, a casting film 380 including a pattern 390 of microstructures 382 is contacted with the substrate 316 so that the structures 382 contact the liquid regions 314 of the hardenable resin composition. The microstructures 382 in the casting film 380 can be formed by a wide variety of techniques, including contacting the film with a metal microreplication master tool formed using diamond turning techniques. The replication can be performed against a master using any microreplication techniques known to those of ordinary skill in the art of microreplication including, for example, embossing, cast and cure of a prepolymer resin (using thermal or photochemical initiation), or hot melt extrusion. In some cases microreplication involves casting of a photocurable prepolymer solution against a template followed by photopolymerization of the prepolymer solution.

In this disclosure, "microstructures" refer to structures that have features that are less than 1000 μm, less than 100 μm, less than 50 μm, or less than 5 μm, or less than 1 μm. The microstructures can have a wide variety of shapes including, but not limited to, grooves separated by V-shaped regions or trapezoidal regions, dots, depressions, prisms, a matte surface, a holographic surface, and the like. For additional information regarding microreplication of three-dimensional structures, see, for example, U.S. Pat. No. 5,183,597 and WO 00/48037, which are incorporated herein by reference.

The microstructures 382 contact the liquid regions 314 and in some cases contact the surface 315 of the substrate 316 in areas of the surface 315 not occupied by the liquid regions 314.

In step 306, the liquid regions are at least partially hardened to form structures 314A in a pattern corresponding to the pattern 312. The structures 314A are formed by at least partially hardening the liquid regions 314 by any suitable technique including, for example, heating, application of UV radiation through the casting film 380, pressure, and combinations thereof.

In step 308, the casting film 380 is peeled away, leaving behind a pattern 322 of structures 324. At least a portion of the structures 324 include a microstructured surface 325 with microstructures 327 corresponding to an inverse of the pattern 390 of the microstructures 382.

The substrate 316 including the microstructured structures 324 may then be contacted with a heated mold (not shown in FIG. 4) and formed into a dental appliance that includes a plurality of cavities configured to retain one or more teeth of a patient. Once released from the mold, the dental appliance includes a pattern of discrete microstructures that corresponds to the pattern 322 of microstructured structures 324.

Figure 5:
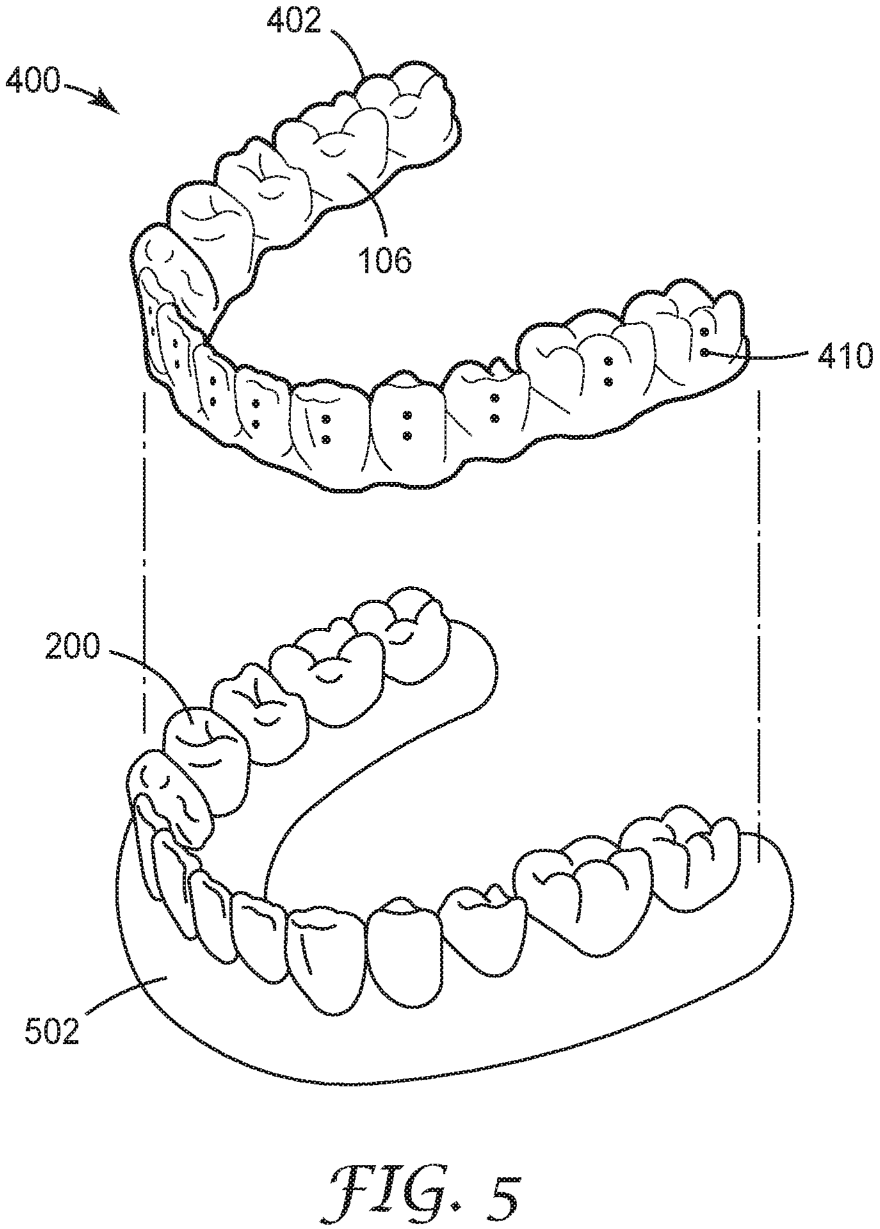
FIG. 5 is a schematic perspective view of a dental appliance as applied to teeth of a patient.

Referring now to FIG. 5, a shell 402 of an orthodontic appliance 400 is an elastic polymeric material that generally conforms to a patient's teeth 500, but that is slightly out of alignment with the patient's initial tooth configuration. In some embodiments, the shell 402 may be one of a group or a series of shells having substantially the same shape or mold, but which are formed from different materials to provide a different stiffness or resilience as need to move the teeth of the patient. In this manner, in one embodiment, a patient or a user may alternately use one of the orthodontic appliances during each treatment stage depending upon the patient's desired usage time or treatment time period for each treatment stage.

No wires or other means may be provided for holding the shell 402 over the teeth 500, but in some embodiments, it may be desirable or necessary to provide individual anchors on teeth with corresponding receptacles or apertures in the shell 402 so that the shell 402 can apply a retentive or other directional orthodontic force on the tooth which would not be possible in the absence of such an anchor.

The shells 402 may be customized, for example, for day time use and night time use, during function or non-function (chewing vs. non-chewing), during social settings (where appearance may be more important) and nonsocial settings (where the aesthetic appearance may not be a significant factor), or based on the patient's desire to accelerate the teeth movement (by optionally using the more stiff appliance for a longer period of time as opposed to the less stiff appliance for each treatment stage).

For example, in one aspect, the patient may be provided with a clear orthodontic appliance 400 that may be primarily used to retain the position of the teeth, and an opaque orthodontic appliance that may be primarily used to move the teeth for each treatment stage. Accordingly, during the daytime, in social settings, or otherwise in an environment where the patient is more acutely aware of the physical appearance, the patient may use the clear appliance. Moreover, during the evening or nighttime, in non-social settings, or otherwise when in an environment where physical appearance is less important, the patient may use the opaque appliance that is configured to apply a different amount of force or otherwise has a stiffer configuration to accelerate the teeth movement during each treatment stage. This approach may be repeated so that each of the pair of appliances are alternately used during each treatment stage.

Referring again to FIG. 5, systems and method in accordance with the various embodiments include a plurality of incremental position adjustment appliances, each formed from the same or a different material, for each treatment stage of orthodontic treatment. The orthodontic appliances may be configured to incrementally reposition individual teeth 500 in an upper or lower jaw 502 of a patient. In some embodiments, cavities 504 are configured such that selected teeth will be repositioned, while others of the teeth will be designated as a base or anchor region for holding the repositioning appliance in place as it applies the resilient repositioning force against the tooth or teeth intended to be repositioned.

Placement of the elastic positioner shell 402 over the teeth 500 applies controlled forces in specific locations to gradually move the teeth into the new configuration. Repetition of this process with successive appliances having different configurations eventually moves a patient's teeth through a series of intermediate configurations to a final desired configuration. During the movement process, structures 410 on the shell 402 provide a therapeutic or aesthetic function as described above.

In one example embodiment, the orthodontic alignment appliances may include a shell 402 made from a clear elastomeric polymeric material and are referred to as a clear tray aligner (CTA). In use, CTAs at stage one (N) of treatment are inserted over a dental arch with misaligned or malocclusion dentition at stage zero (N−1). The polymeric tray can be stretched to force the dentition to reposition into the next stage one (N). In other words, each aligner tray starts out "ill-fitting" on purpose. The polymeric tray may have a contoured surface to be able to engage and transfer forces to the dentition to effectively reposition the right tooth or set of teeth at a designated location, vector and time. Because of the ability of the polymeric tray to engage and/or transfer forces to the dentition while starting out "ill-fitting," the CTA can be effective and/or efficient appliance for, e.g., correcting Class II malocclusions, more comfortable to patient, easy to place/remove, and providing predictable treatment outcome. Therefore, a polymeric aligner tray with some flexibility at least in part because of its flat surface may be able to engage and/or transfer forces to the dentition to effectively reposition the right tooth or set of teeth at a designated location, vector and time. Because of the fit between the tooth or set of teeth, the CTA can be effective and/or efficient appliance for correcting Class II malocclusions and be comfortable to the patient, easy to place/remove, predictable treatment outcome, etc.

Embodiments will now be illustrated with reference to the following non-limiting examples.

EXAMPLES

Comparative Example—Direct Patterning

Flexographic and inkjet printing were used to create continuous large area coverage graphics on a clear thermoplastic film (available under the trade designation Duran PETG (12.5 cm diameter×0.75 mm thick) from Scheu Dental Tech Iserlohn, Germany). Flexographic and inkjet printing used an opaque UV-curable white ink (available under the trade designation Nazdar 9301 from Nazdar Ink Technologies, Shawnee, KS) and a blue UV-curable ink available under the trade designation Inkjet Cyan Ink, from Brownwood, respectively.

Flexographic printing was performed with a Flexiproofer 100 (RK Print Coat Instruments, Litlington, Royston, Herts, UK) at a speed of 10 m/min, using a 6.0 BCM 400LPI anilox roll and a printing plate available from DowDupont under the trade designation Cyrel DPR 0.067 imaged with a repeating array of inverse "3M" logos approximately 2.5 mm×5 mm on a pitch of 34 mm down web and 14 mm cross web (SGS, Brooklyn Park, MN), mounted with 3M E1060H Cushion-Mount (3M, St. Paul, MN) flexographic printing tape.

The printed PETG disc was then transported through a Fusion UV conveyor belt equipped with a H-Bulb UV curing lamp (Haraeus Group, Hanau, Germany) to sufficiently cure and solidify the printed ink (i.e., such that it felt hard to the touch and could not be rubbed from the PETG surface). The inkjet printer was a piezoelectric 3M-assembled tabletop unit.

Figure 6:
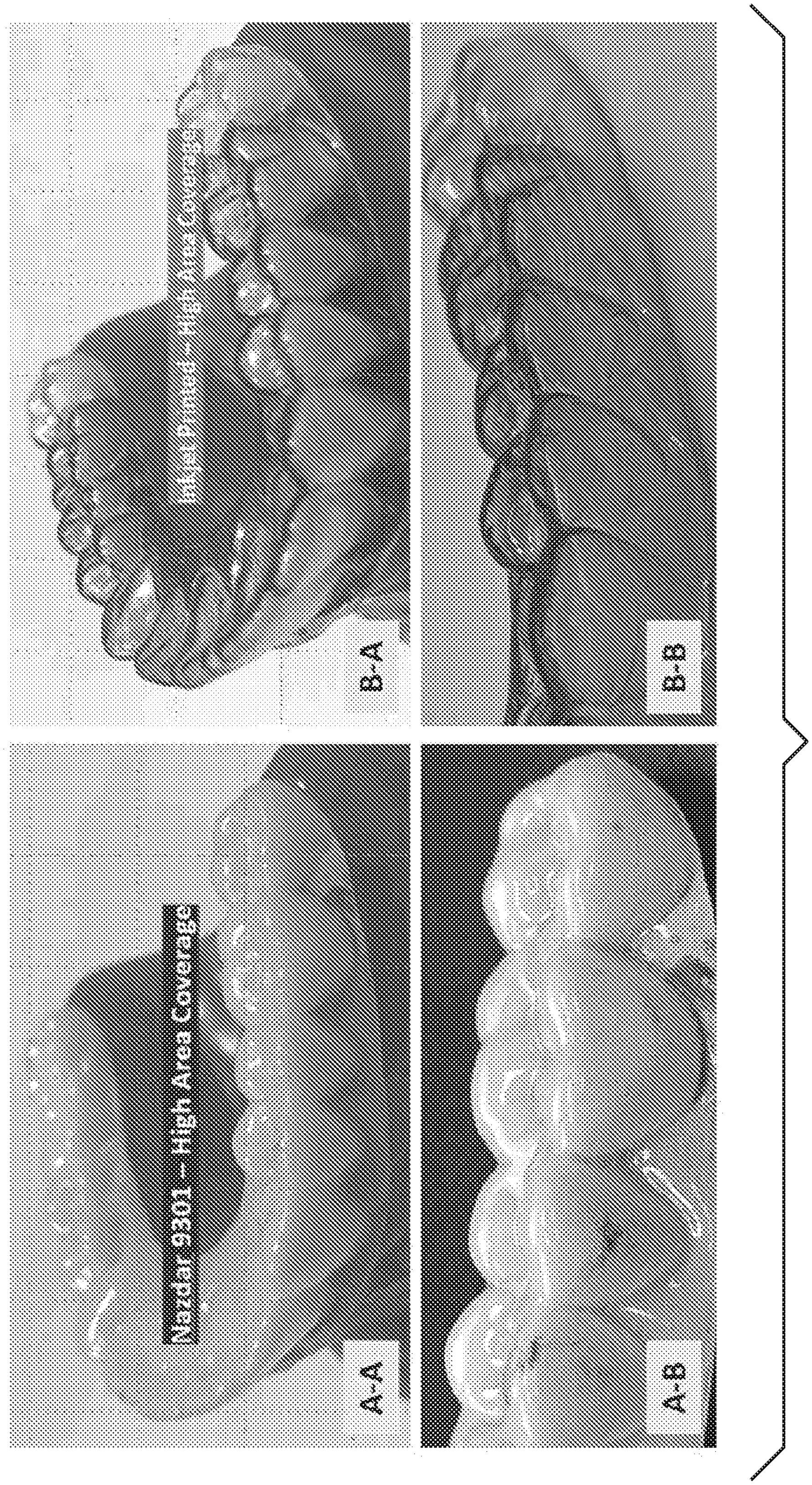

The printed PETG discs were thermoformed with a Biostar VI pressure molding/thermoforming machine (Scheu Dental, Great Lakes, Tonawanda, NY) to shape aligner trays per UTK-RDTP-11-300071. As shown in FIG. 6, A-A and B-A are low magnification images of thermoformed aligner trays with the large-area coverage prints and, A-B and B-B, were high magnification images of posterior portion of the aligner trays. As can be seen from FIG. 6A-B and B-B, the aligner trays with large-area covered graphics were subjected to color and image distortion when the substrate was subjected to large strains during thermoforming.

Example 1—Direct Patterning

To exemplify the first approach of direct patterning a discrete pattern, a benchtop stencil printer was used to deposit pattern dots of different diameters, aspect ratios and pattern densities with an epoxy adhesive available from 3M, St. Paul, MN, under the trade designation Scotch-Weld Epoxy Adhesive DP100 Plus Clear. Stencils of different opening and thickness were obtained from Sefar Inc, Buffalo, NY.

DP 100 epoxy dots were printed on one side of clear PETG disc (125 mm diameter×0.75 mm thick) from Scheu Dental Tech, Iserlohn, GE, on top of a disk in contact with the disk then dispensing the epoxy on the stencil using a blade. The printed epoxy pattern was hardened under ambient conditions in a ventilated hood.

Figure 7:
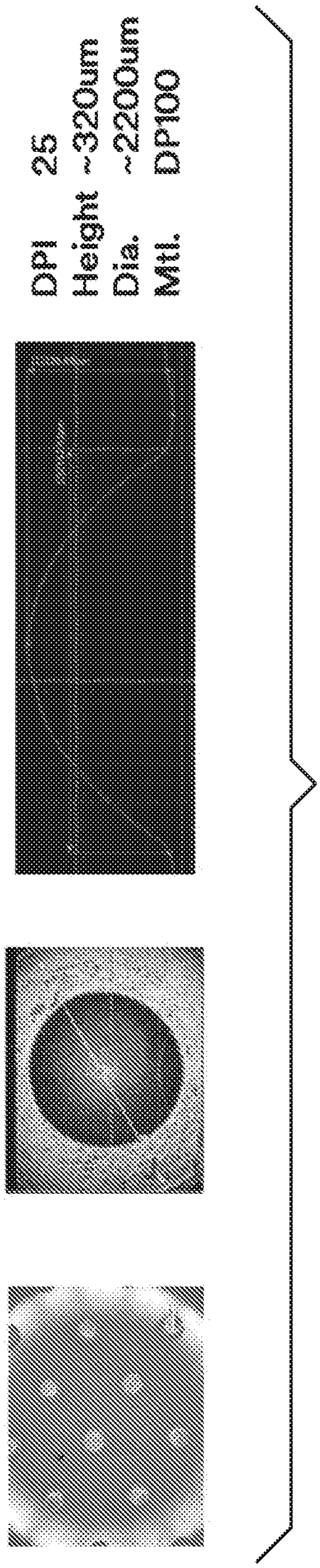
FIG. 7 includes photographs of optical and profilometry data for the structures on the dental appliance of Example 1.

FIG. 7 shows an example of stencil printed pattern on PETG, and Table 1 details the range of dot sizes and aspect ratios that were printed in this study.

The printed PETG discs were thermoformed with a Biostar VI pressure molding/thermoforming machine (Scheu Dental, Great Lakes, Tonawanda, NY) to shape aligner trays per UTK-RDTP-11-300071.

TABLE 1

| Sample | DPI | Diameter (um) | Height (um) | Aspect Ratio |
|---|---|---|---|---|
| Dots 169 DPI | 169 | 1400 | 190 | 0.14 |
| Dots 25 DPI | 25 | 1000 | 50 | 0.05 |
| Large Dots 25 DPI | 25 | 2200 | 320 | 0.15 |
| Dots 289 DPI | 289 | 900 | 130 | 0.14 |
| 4 Dot Array #1 | 4096 | 350 | 70 | 0.20 |
| 4 Dot Array #2 | 625 | 550 | 90 | 0.16 |
| 4 Dot Array #3 | 289 | 750 | 140 | 0.19 |
| 4 Dot Array #4 | 169 | 1050 | 120 | 0.11 |

Example 2—Direct Patterning

To exemplify the second approach of direct patterning a discrete aesthetic pattern, a UV white repeating dot pattern (Nazdar 9301, Nazdar Ink Technologies, Shawnee, KS) was flexographically printed on one side of a PETG film (0.75 mm thickness) with using a pilot-scale roll-to-roll printing line. The printed dot, as shown in FIG. 7A, had a hexagonal pattern (600 μm diameter, 1200 μm diagonal spacing, and a 1050 μm cross-web spacing). The printed pattern was hardened through a Xeric Web UV curing station (XDS Holding Inc, Neenah, WI) such that the printed pattern was smudge-proof.

The printed PETG was then thermoformed with a Biostar VI pressure molding/thermoforming machine (Scheu Dental, Great Lakes, Tonawanda, NY) to shape a thermoplastic disc with 125 mm diameter into an orthodontic aligner tray per UTK-RDTP-11-300071.

Figure 8A:
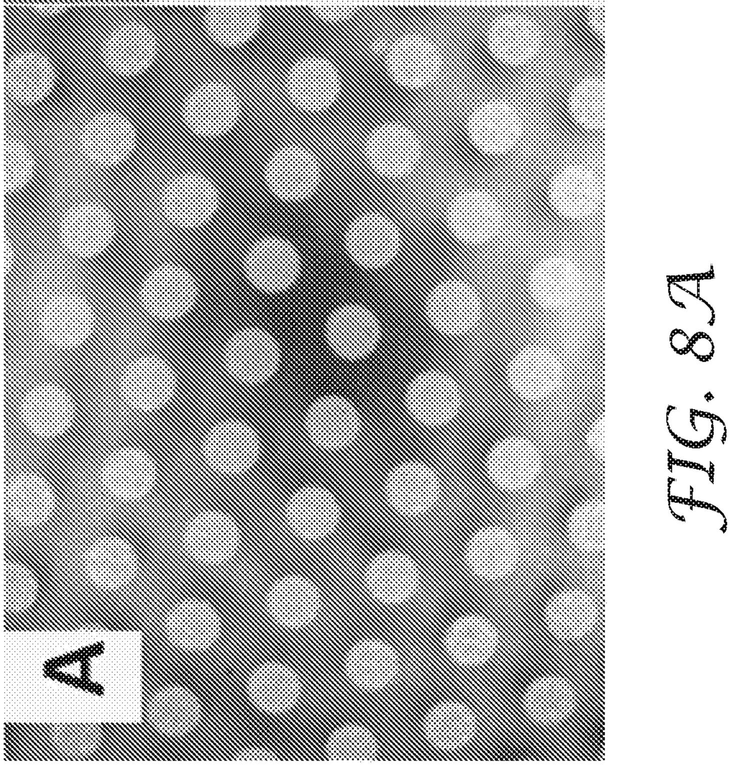
FIG. 8A is a photograph of a flexographically generated pixelated (dot) pattern on PETG film of Example 2.
Figure 8B:
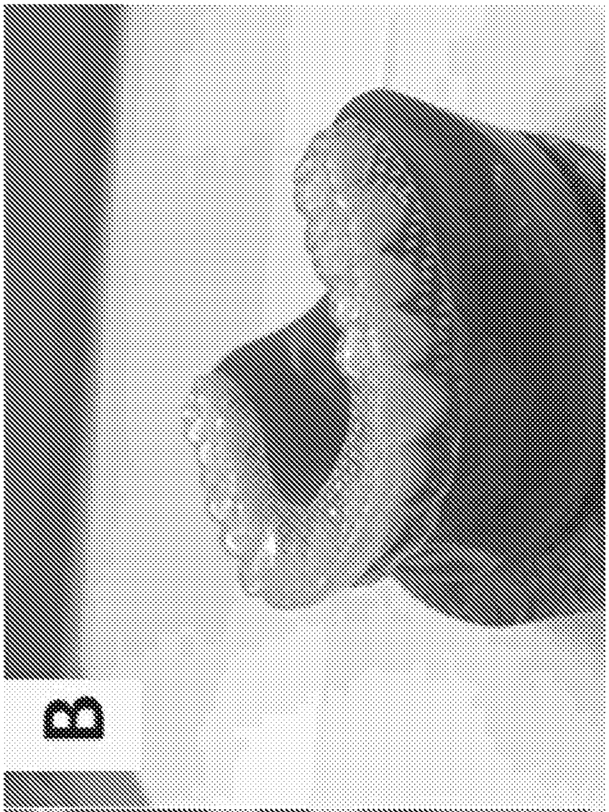
FIG. 8B is a photograph of the same PETG film with dot pattern shaped into a dental appliance on a typodont arch showing no visible distortion in image quality.

FIG. 8A is a micrograph of the printed white dots on the PETG substrate and FIG. 8B is a photograph of the final thermoformed dental article with the dot-patterned esthetic with no visible image distortion as seen in the Comparative Example.

Example 3

This example utilized a direct patterning approach, but the printed ink included monolaurin, an antimicrobial and/or antibiofilm agent. The monolaurin was dissolved in a Nazdar 9301 white ink to print on PETG discs in a Flexiproofer 100 (RK Print Coat Instruments, Litlington, Royston, Herts UK). The printed image was a repeating array of "3M" logos approximately 5 mm×9 mm on a pitch of 20 mm down web and 10 mm cross web (SGS, Brooklyn Park, MN).

The printed PETG was then transported through a Fusion UV conveyor belt equipped with a H-Bulb UV curing lamp (Haraeus Group, Hanau, Germany) to sufficiently cure and solidify the printed ink (i.e., such that it felt hard to the touch, and could not be rubbed from the PETG surface). The ink consisting of 2% monolaurin exhibited a 4-log reduction in *s. mutans* bacteria after 24 hr.

The printed PETG was then thermoformed with a Biostar VI pressure molding/thermoforming machine (Scheu Dental, Great Lakes, Tonawanda, NY) to shape a thermoplastic disc with 125 mm diameter into an orthodontic aligner tray per UTK-RDTP-11-300071.

Figure 9A:
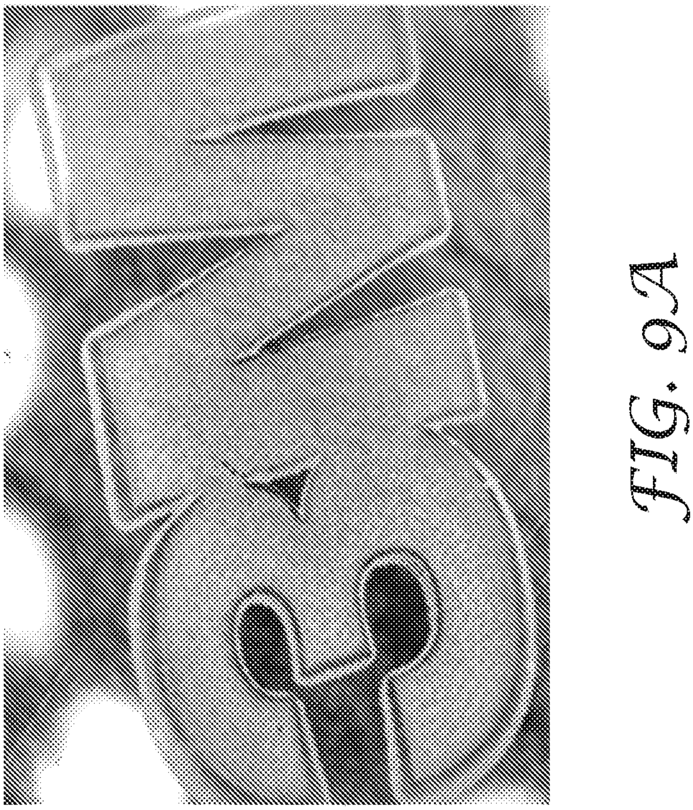
FIG. 9A is a photograph of a flexographically-printed 3M logo with antimicrobial monolaurin on PETG film of Example 3.
Figure 9B:
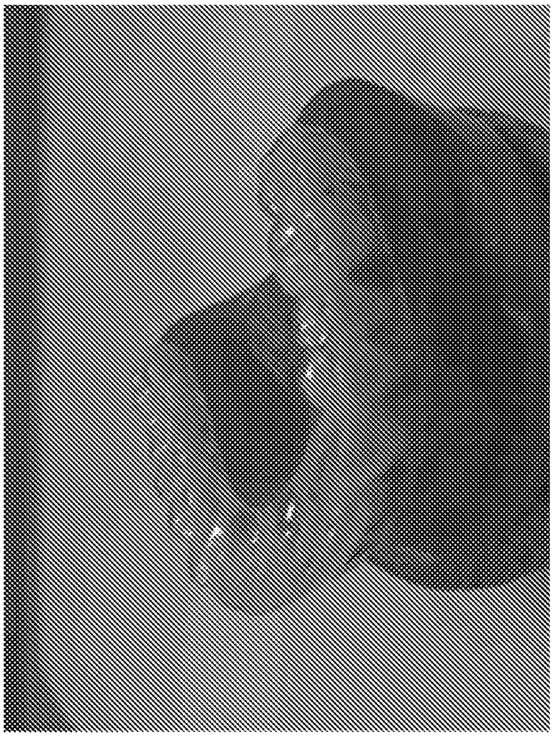
FIG. 9B is a photograph of a dental appliance with the antimicrobial print on a typodont.

FIG. 9A shows a photograph of the printed 3M logos (containing antimicrobial monolaurin) on the PETG and FIG. 9B is a photograph of a dental appliance with an antimicrobial 3M logo on typodont.

Example 4—Indirect Patterning

To exemplify "indirect patterning" of a discrete aesthetic pattern, a repeating red dot pattern was flexographically printed onto a release liner on a pilot printing line and later was transferred to 0.75 mm thick clear PETG. The release liner substrate was a silicone coated paper liner (Loparex, Willowbrook, Ill.).

A DowDupont Cyrel DPR 0.067 inch (1.50 mm) flexographic printing plate imaged with a repeating array of 330 μm diameter dots on a 630 μm pitch (Southern Graphics Systems Inc., Brooklyn Park, MN) mounted with 3M E1060H Cushion-Mount (3M, St. Paul, MN) flexographic printing tape, and printed with Nazdar 9385 Fluorescent Red (Nazdar Ink Technologies, Shawnee, KS) mixed with 4% Cab-O-Sil TS610 fumed silica (Cabot, Boston, MA).

The red ink pattern on the release liner substrate was then transported through a Xeric Web UV curing station (XDS Holding Inc, Neenah, WI) to sufficiently harden the printed ink (i.e., such that it felt hard to the touch, and could not be rubbed from the PETG surface).

Then the printed image on the liner substrate was transferred on to PETG discs (125 mm diameter×0.75 mm thick) in a Carver press at 5000 psi for 1 minute (60 sec) and 225° F. (107° C.).

Subsequently, the release liner was peeled away from the PETG to transfer the image onto the PETG.

The PETG discs with indirectly printed red dots were then thermoformed with a Biostar VI pressure molding/thermoforming machine (Scheu Dental, Great Lakes, Tonawanda, NY) to produce a dental article per UTK-RDTP-11-300071.

Figure 10B:
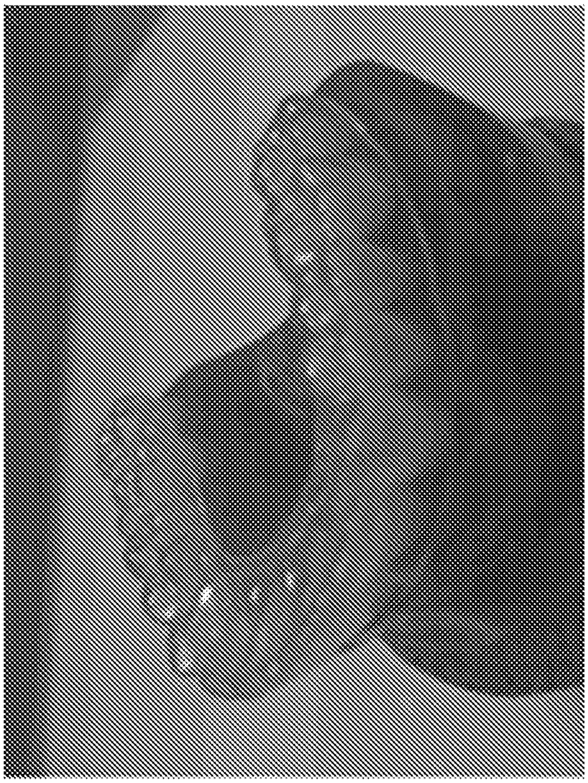
FIG. 10B is a photograph of a dental appliance on a typodont and including the red dots.
Figure 10A:
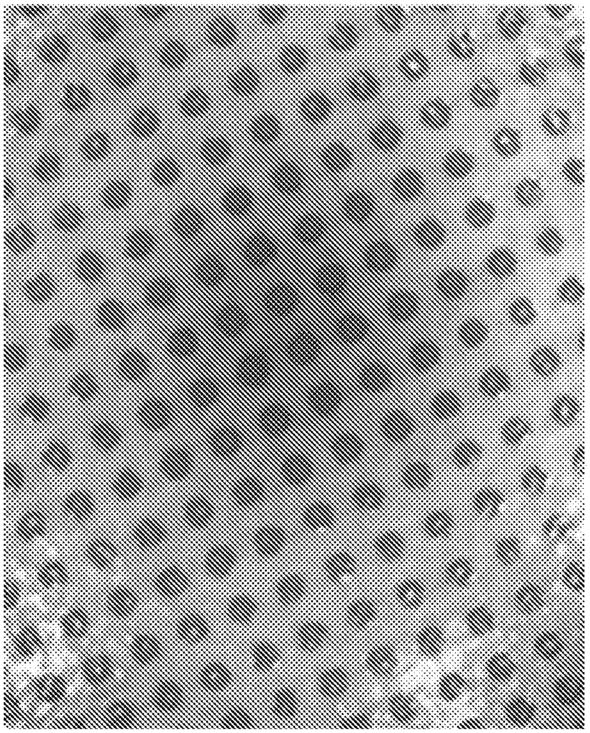
FIG. 10A is a photograph of indirectly printed red dots of Example 4.

FIG. 10A shows a micrograph of the red dots printed on the liner substrate and FIG. 10B is a photograph of a dental article patterned with red dots on a typodont.

Example 5—Structures with Microstructured Features

This example utilized a direct patterning approach as in Example 3 above, but after the print the features were subsequently structured by contacting them with a micro structured surface of a casting film as shown schematically in FIG. 4 above. A UV clear repeating pattern (Nazdar 1028, Nazdar Ink Technologies, Shawnee, KS) was flexographically printed on one side of a PETG film (0.75 mm thickness) using a Flexiproofer 100 (RK Print Coat Instruments, Litlington, Royston, Herts UK). The printed image had a repeating array of "3M" logos approximately 5 mm×9 mm on a pitch of 20 mm down web and 10 mm cross web (SGS, Brooklyn Park, MN).

The printed pattern was then laminated to a microstructured casting film with a diffuse structure from Breit Technologies LLC. The printed pattern laminated to a casting film was hardened through the casting film using a Fusion UV conveyor belt equipped with a H-Bulb UV curing lamp (Haraeus Group, Hanau, Germany) to sufficiently cure and solidify the printed ink (i.e., such that it felt hard to the touch, and could not be rubbed from the PETG surface).

The printed PETG was then thermoformed with a Biostar VI pressure molding/thermoforming machine (Scheu Dental, Great Lakes, Tonawanda, NY) to shape a thermoplastic disc with 125 mm diameter into an orthodontic aligner tray per UTK-RDTP-11-300071.

Figure 11:
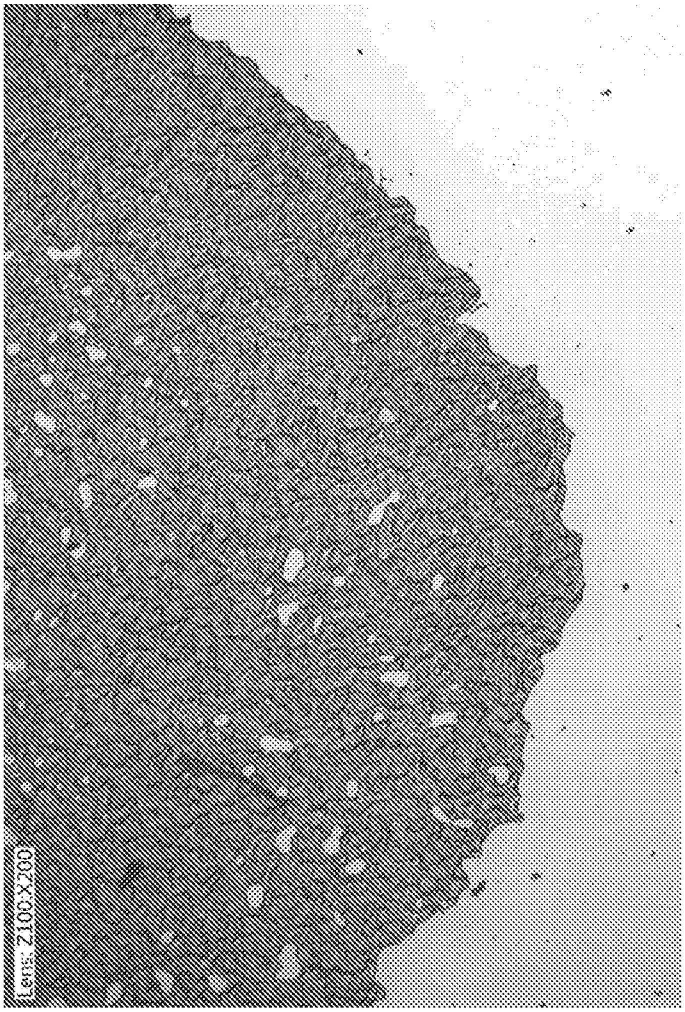
FIG. 11 is a photograph of a microstructured structure of Example 5.

FIG. 11 shows a photograph of the printed and structured 3Ms on the PETG.

All cited references, patents, and patent applications in the above application for letters patent are herein incorporated by reference in their entirety in a consistent manner. In the event of inconsistencies or contradictions between portions of the incorporated references and this application, the information in the preceding description shall control. Various embodiments of the invention have been described. These and other embodiments are within the scope of the following claims.

The invention claimed is:

1. A method for making a dental appliance configured to position at least one tooth of a patient, the method comprising:

printing a hardenable liquid resin composition on a major surface of a polymeric material to form a pattern of discrete unhardened liquid regions thereon, wherein each liquid region of the pattern of discrete unhardened liquid regions is separate from and does not share an edge-to-edge border with other liquid regions of the pattern of discrete unhardened liquid regions, wherein the hardenable liquid resin composition further includes a solvent or a liquid carrier and at least one therapeutic agent, and wherein the hardenable liquid resin composition includes a resin matrix, the at least one therapeutic agent incorporated into the resin matrix, and wherein a resin material selected for the resin matrix has a first glass transition temperature that is higher than a second glass transition temperature of the polymeric material;

at least partially hardening the unhardened liquid regions to form a corresponding array of structures on the major surface of the polymeric material, wherein the structures have a characteristic cross-sectional dimension of about 25 microns to about 1 mm, and a feature spacing of about 100 microns to about 2000 microns; and forming a plurality of cavities in the polymeric material to form the dental appliance, wherein the dental appliance comprises an arrangement of cavities configured to receive one or more teeth.

2. The method of claim 1, wherein about 20% to about 98% of a surface of the dental appliance is free of the structures.

3. The method of claim 1, wherein the dental appliance has at least one of a visible light transmission of about 75% to about 99%, a haze of less than about 20%, and a clarity of about 75% to about 100%.

4. The method of claim 1, wherein the structures on a substantially flat sheet of the polymeric material are distorted by less than about 50% in any dimension following forming the plurality of cavities.

5. The method of claim 1, wherein the array of structures comprises an aesthetic pattern.

6. The method of claim 5, wherein the array of structures is printed with flexographic printing or screen printing.

7. The method of claim 1, wherein the hardenable liquid resin composition comprises a hardenable resin, the liquid carrier, and wherein the at least one therapeutic agent is chosen from antimicrobial agents, anti-biofilm agents, friction-reducing agents, anti-cavity agents, and mixtures and combinations thereof.

8. The method of claim 7, wherein the composition comprises an antimicrobial therapeutic agent exhibiting at least a 2-log microbial reduction against *S. aureus* and *S. mutans* following 24 hour contact.

9. The method of claim 8, wherein the antimicrobial therapeutic agent comprises Ag, monolaurin, metal oxides (MOx), functional sugar carboxylates, or mixtures or combinations thereof.

10. The method of claim 9, wherein the antimicrobial therapeutic agent is a metal oxide MOx chosen from AgOx, ZnOx, CuOx, TiOx, AlOx or mixtures or alloys thereof.

11. The method of claim 10, wherein the metal oxide is chosen from AgCuZnOx, Ag doped ZnOx, Ag doped AZO, Ag doped Ti02, Al doped ZnO, and TiOx.

* * * * *